United States Patent
Boersma et al.

(10) Patent No.: US 11,093,246 B2
(45) Date of Patent: Aug. 17, 2021

(54) BANKED SLICE-TARGET REGISTER FILE FOR WIDE DATAFLOW EXECUTION IN A MICROPROCESSOR

(71) Applicant: International Business Machines Corporation, Armonk, NY (US)

(72) Inventors: Maarten J. Boersma, Holzgerlingen (DE); Niels Fricke, Herrenberg (DE); Michael Klaus Kroener, Ehningen (DE); Hung Q. Le, Austin, TX (US); Dung Q. Nguyen, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 16/563,015

(22) Filed: Sep. 6, 2019

(65) Prior Publication Data
US 2021/0072991 A1   Mar. 11, 2021

(51) Int. Cl.
*G06F 9/30* (2018.01)

(52) U.S. Cl.
CPC ...... *G06F 9/30123* (2013.01); *G06F 9/30141* (2013.01); *G06F 9/30145* (2013.01)

(58) Field of Classification Search
CPC ............. G06F 9/30123; G06F 9/30141; G06F 9/30145
See application file for complete search history.

(56) References Cited

U.S. PATENT DOCUMENTS

| | | | | |
|---|---|---|---|---|
| 4,594,660 A | * | 6/1986 | Guenthner | G06F 9/3885 712/23 |
| 6,237,076 B1 | | 5/2001 | Gaertner et al. | |
| 6,366,998 B1 | * | 4/2002 | Mohamed | G06F 9/30036 712/17 |
| 6,711,602 B1 | * | 3/2004 | Bhandal | G06F 9/3853 708/625 |
| 6,874,079 B2 | | 3/2005 | Hogenauer | |
| 7,334,201 B1 | * | 2/2008 | Sanghavi | G06F 30/30 716/136 |
| 8,046,566 B2 | | 10/2011 | Abernathy et al. | |

(Continued)

OTHER PUBLICATIONS

Anonymously; "Method to reduce the area and increase the speed of a highly ported register file" Nov. 13, 2002, htpp://ip.com/IPCOM/000010255D, pp. 1-8.

(Continued)

*Primary Examiner* — Farley Abad
(74) *Attorney, Agent, or Firm* — Scully, Scott, Murphy & Presser, P.C.

(57) ABSTRACT

A computer system, processor, and method for processing information is disclosed that includes at least one computer processor, a register file associated with the at least one processor, the register file having a plurality of entries for storing data and sliced into a plurality of register banks, each register bank having a portion of the plurality of entries for storing data, one or more write ports to write data to the register file entries, and a plurality of read ports to read data from the register file entries; one or more read multiplexors associated with one or more read ports of each register bank and configured to receive data from the respective register banks; and one or more write multiplexors associated with one or more of the register banks.

18 Claims, 14 Drawing Sheets

(56) References Cited

U.S. PATENT DOCUMENTS

| | | |
|---|---|---|
| 8,069,290 B2 | 11/2011 | Conti et al. |
| 8,261,046 B2 | 9/2012 | Gibert et al. |
| 8,412,761 B2 | 4/2013 | Yoshida |
| 9,207,995 B2 | 12/2015 | Boersma et al. |
| 9,323,528 B2 | 4/2016 | Sasanka |
| 9,690,586 B2 | 6/2017 | Eisen et al. |
| 9,720,696 B2 | 8/2017 | Chu et al. |
| 9,804,851 B2 | 10/2017 | Grisenthwaite et al. |
| 9,870,045 B2 | 1/2018 | Battle et al. |
| 10,282,206 B1 | 5/2019 | Sun et al. |
| 2007/0239970 A1 | 10/2007 | Liao et al. |
| 2008/0313424 A1 | 12/2008 | Gschwind |
| 2009/0198966 A1 | 8/2009 | Gschwind et al. |
| 2013/0246761 A1 | 9/2013 | Derby et al. |
| 2015/0006855 A1 | 1/2015 | Gschwind et al. |
| 2015/0121047 A1 | 4/2015 | Bradbury et al. |
| 2016/0070574 A1* | 3/2016 | Boersma ............ G06F 9/3012 712/214 |
| 2016/0092231 A1 | 3/2016 | Chu et al. |
| 2016/0357566 A1 | 12/2016 | Bowman et al. |
| 2017/0109093 A1* | 4/2017 | Chu ................ G06F 9/30036 |
| 2017/0109171 A1 | 4/2017 | Eisen et al. |
| 2018/0225124 A1 | 8/2018 | Gupta et al. |

OTHER PUBLICATIONS

IBM; "A method of register renaming for a merged register file sharing different data types", Feb. 4, 2008, htpp://ip.com/IPCOM/000167251D, pp. 1-4.

Anonymously, "Control for activation of reduced leakage mode in write circuitry of SRAM arrays and register files", Apr. 25, 2012, htpp://ip.com/IPCOM/00216955D, pp. 1-4.

Zilles C. et al., "Execution-based Prediction Using Speculative Slices", 28th Annual International Symposium on Computer Architectures (ISCA2001) Jul. 2001, pp. 1-12.

Collins, JD. et al., "Dynamic Speculative Precomputation", In Proceedings of the 34th International Symposium on Mircroarchitecture, Dec. 2001, pp. 1-12.

Anne Bracy, Prashant Prahlad, and Amir Roth, "Dataflow minigraphs: Amplifying superscalar capacity and bandwidth," In Microarchitecture, 2004. MICRO-37 2004. 37th International Symposium on, pp. 18-29. IEEE, 2004.

Stephan Wong, Fakhar Anjam, Faisal Nadeem, "Dynamically reconfigurable register file for a softcore VLIW processor," Date 'Oct. 2010, Proceedings of the Conference on Design, Automation and Test in Europe, pp. 969-972.

John Kloosterman, Jonathan Beaumont, D. Anoushe Jamshidi, Jonathan Bailey, Trevor Mudge, and Scott Mahlke, "Regless: just-in-time operand staging for GPUs," Oct. 2017 MICRO-50 '17: Proceedings of the 50th Annual IEEE/ACM International Symposium on Microarchitecture, pp. 151-164.

Athanasaki, E. et al., "Exploring the Performance Limits of Simultaneous Multithreading for Memory Intensive Applications", Springer Science+Business Media, LLC, 2007, pp. 1-34.

IBM, "Method of Saving Power in a Register File Supporting Multiple SMT Modes Using a Free List Stack to Manage Allocation/Deallocation of the Register File Pointers", Feb. 5, 2008, htpp://ip.com/IPCOM000167259D, pp. 1-4.

Anonymously, "System and Method for Achieving Out-of-Order Execution of Instructions in Simultaneous Multithreaded (SMT) Processor Cores", Sep. 20, 2010, htpp://ip.com/IPCOM000199883D, pp. 1-6.

Anonymously, "Method and System for Implementing "Register Threads" in a Simultaneously-Multithreaded (SMT) Processor Core", Sep. 17, 2010, htpp://ip.com/IPCOM000199825D, pp. 1-5.

List of IBM Patents or Patent Applications Treated as Related, Nov. 23, 2019, pp. 2.

Notice of Allowance dated Feb. 8, 2021 received in U.S. Appl. No. 16/562,934.

IBM, "Powers Processor User's Manual for the Single-Chip Module", International Business Machines Corporation, Mar. 16, 2016, pp. 31-35, 135, 149, 266-268 and 449-450.

IBM, "IBM POWER8 processor core Microarchitecture", International Business Machines Corporation, Jan./Feb. 2015, pp. 2: 1 to 2:2, vol. 59 No. 1.

Office Action dated Nov. 25, 2020 received in U.S. Appl. No. 16/563,091, 45 pages.

* cited by examiner

BANKED SLICE-TARGET REGISTER FILE FOR WIDE DATAFLOW EXECUTION IN A MICROPROCESSOR

BACKGROUND OF INVENTION

The present invention generally relates to data processing systems, processors, and more specifically to register files in processors, including out-of-order execution processors.

Processors currently used in data processing systems process more than one instruction at a time, and often process those instructions out-of-order. In modern computer architecture, there are several known ways to design a computer adapted to perform more than one instruction at a time, or at least in the same time frame. For example, one design to improve throughput includes multiple execution slices within a processor core to process multiple instruction threads at the same time, with the threads sharing certain resources of the processor core. An execution slice may refer to multiple data processing hardware units connected in series like a pipeline or pipeline-like structure within a processor to process multiple instructions in a single processing cycle. Pipelining involves processing instructions in stages, so that a number of instructions are processed concurrently. Multiple execution slices may be used as part of simultaneous multi-threading within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. An instruction in the issue queue typically is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

SUMMARY

The summary of the disclosure is given to aid understanding of a computer system, computer architectural structure, processor, register files, and method of using register files in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

In one or more embodiments, a computer system for processing information is disclosed. The computer system in an embodiment includes at least one processor; a register file associated with the at least one processor, the register file having a plurality of entries for storing data and sliced into a plurality of register banks, each register bank having a portion of the plurality of entries for storing data, one or more write ports to write data to the register file entries, and a plurality of read ports to read data from the register file entries; one or more read multiplexors associated with one or more read ports of each register bank and configured to receive data from the respective register banks; and one or more write multiplexors associated with one or more of the register banks, and in an embodiment the processor is configured to write data to at least one of the plurality of register banks. In an embodiment, the computer system further comprising a plurality of execution units, wherein the processor is configured so that each execution unit receives data from one or more of the read multiplexors, and sends results to one or more write multiplexors. According to an aspect, the processor has at least two execution slices arranged and configured as a super slice wherein a first execution slice has at least two register banks and a second execution slice has at least a copy of each of the register banks in the first execution slice, and the first execution slice has a plurality of execution units that are configured to write to even register banks, and the second execution slice has a plurality of execution units that are configured to write to odd register banks.

In an embodiment, the first execution unit in the first execution slice is configured to communicate its result to a write port in the first register bank in the first execution slice and to a first write multiplexor, and an output of the first write multiplexor is configured to communicate to a write port of a first copy of the register bank in the second execution slice. In an aspect, the second execution unit in the first execution slice is configured to communicate its result to the first write multiplexor. The processor according to an embodiment is configured so that in response to processing wide data instructions the result from the first execution unit in the first execution slice is communicated to the write port in the first register bank in the first execution slice, and configured so that input communicated to the first write multiplexor from the second execution unit in the first execution slice is selected as the output of the first write multiplexor and communicated to the write port of a first copy of the register bank in the second execution slice. In a further aspect, the processor is configured so that the result from the second execution unit in the second execution slice is communicated to a write port in a second copy of the register bank in the second execution slice and to a second write multiplexor, and an output of the second write multiplexor is configured to communicate to a write port of a second register bank in the first execution slice. The first execution unit in the second execution slice in an embodiment is configured to communicate its result to the second write multiplexor. In one or more embodiments, the processor is configured so that in response to processing wide data instructions the result from the second execution unit in the second execution slice is communicated to the write port in the second copy of the register bank in the second execution slice, and configured so that input communicated to the second write multiplexor from the first execution unit in the second execution slice is selected as the output of the second write multiplexor and communicated to the write port of the second register bank in the first execution slice.

In another aspect, a computer system for processing information is disclosed where the computer system has at least one processor; one or more computer readable non-transitory storage media; and programming instructions stored on the one or more computer readable non-transitory storage media for execution by the at least one processor, the programming instructions comprising: programming instructions so that each execution unit receives data from one or more read multiplexors; and programming instructions so that each execution unit sends results to one more write multiplexors.

A method of processing instructions in a processor is also disclosed. The method includes reading data from one or more STF banked register files associated with a first execution slice of the processor; reading data from one or more STF banked register files associated with a second execution slice of the processor; communicating data read from the STF banked register files associated with the first execution slice to a first set of read multiplexors associated with the first execution slice; communicating data read from the STF banked register files associated with the second execution slice to a second set of read multiplexors associated with the second execution slice; selecting data from the first set of read multiplexors and communicating that data to a first execution unit in the first execution slice; selecting data from the second set of read multiplexors and communicating that data to a second execution unit; executing a first instruction in the first execution unit using data received from the first set of multiplexors; executing a second instruction in the second execution unit using data received from the second set of multiplexors; writing results from the first execution unit to a first STF banked register file associated with the first execution slice; communicating results from the second execution unit to a first write multiplexor; communicating results from the first execution unit to the first write multiplexor; and in response to the width of the data being processed, selecting data sent to the first write multiplexor from (a) the first execution unit, or (b) the second execution unit, and communicating and writing the respective data to a first STF banked register file associated with the second execution slice, wherein the first and second instructions are part of the same instruction when processing a wide data instruction.

BRIEF DESCRIPTION OF THE DRAWINGS

The various aspects, features, and embodiments of the computer system, computer architectural structure, processors, register files, and/or their method of operation will be better understood when read in conjunction with the figures provided. Embodiments are provided in the figures for the purpose of illustrating aspects, features, and/or various embodiments of the computer system, computer architectural structure, processors, register files, and their method of operation, but the claims should not be limited to the precise system, embodiments, methods, processes and/or devices shown, and the features, and/or processes shown may be used singularly or in combination with other features, and/or processes.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, register files, and their method of operation, however, it will be understood by those skilled in the art that different and numerous embodiments of the computer system, computer architectural structure, processor, register files, and their method of operation may be practiced without those specific details, and the claims and invention should not be limited to the system, assemblies, subassemblies, embodiments, features, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of registers. It may be noted that a numbered element is numbered according to the figure in which the element is introduced, and is often referred to by that number in succeeding figures.

Figure 1:
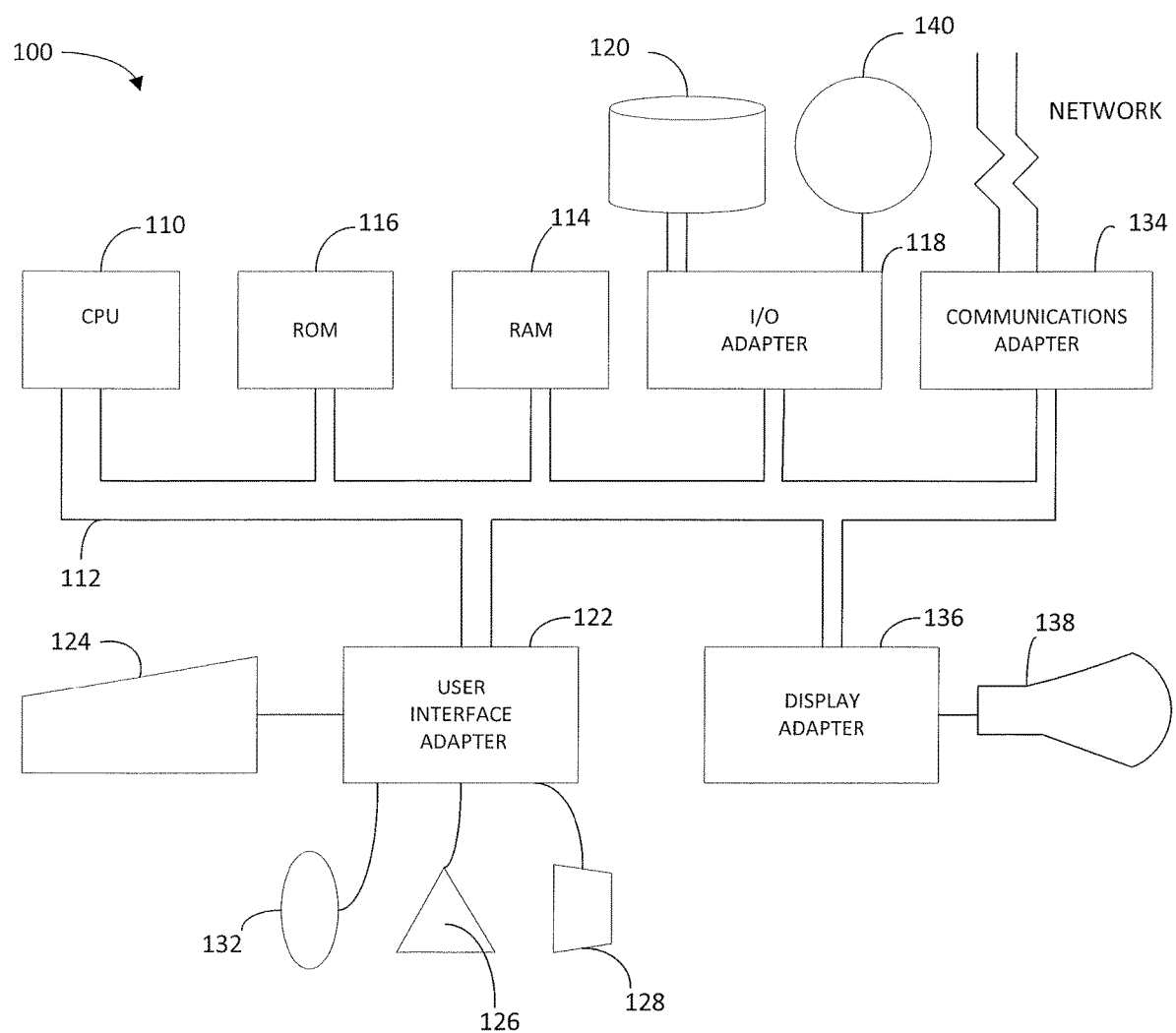
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
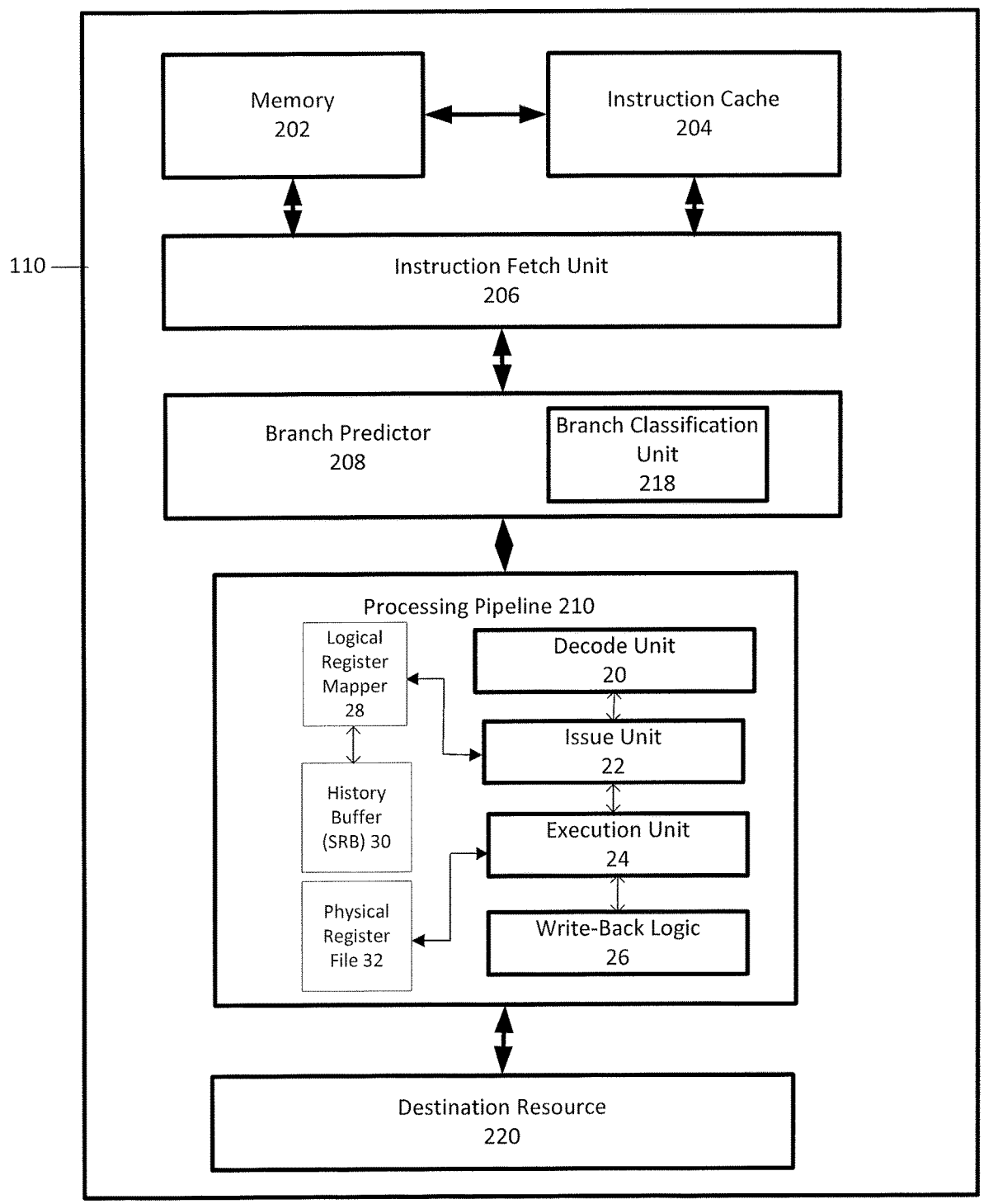
FIG. 2 illustrates a block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory. The memory 202 and instruction cache 204 can include multiple cache levels.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units (LSUs), vector scalar execution units (VSUs), and/or other execution units. The logical register mapper 28 contains entries which provide a mapping between a logical register entry (LReg) and an entry in the physical register file 32. When an instruction specifies to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer stores information from the logical register mapper 28 when a new instruction evicts data in case the new instruction is flushed and the old data needs to be recovered. The history (SRB) 30 buffer keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
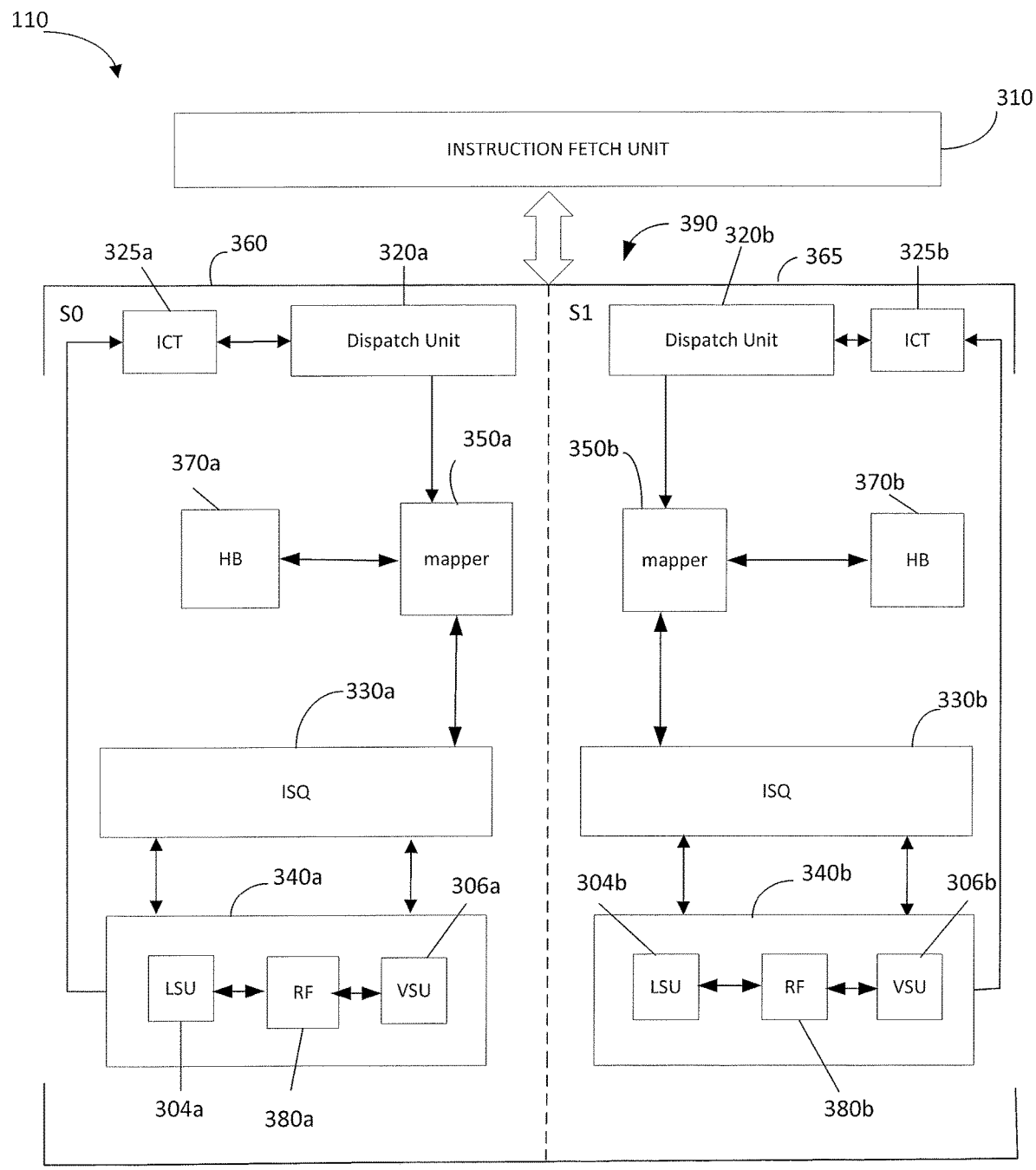
FIG. 3 illustrates a block diagram of a portion of a multi-slice processor in accordance with certain aspects of the present disclosure.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other configurations. As shown in FIG. 3, the multi-slice processor includes two processing slices-Slice 0 (slice S0 or 360) and Slice 1 (slice S1 or 365). The processor includes an Instruction Fetch unit 310. Each of the slices S0 and S1 includes an Instruction Dispatch Unit (320a and 320b); an Issue Queue (ISQ) (330a and 330b); Instruction Completion Table (ICT) (325a and 325b); Execution Units (340a and 340b) that include a load store unit (LSU) (304a and 304b), a vector scalar unit (VSU) (306a and 306b), and a Register File (RF) (380a and 380b); a History Buffer (HB) (370a and 370b); and a Logical Register Mapper (350a and 350b). The Execution Unit 340 may include one or more queues to hold instructions for execution by the Execution Unit 340.

It may be noted that the two slices are shown for ease of illustration and discussion only, and that multi-slice processor 110 may include more than two processing or execution slices with each slice having all the components discussed above for each of the slices S0 and S1 (slices 360 and 365). Further, the processing slices may be grouped into super slices (SS 390), with each super slice including a pair of processing slices. For example, a multi-slice processor may include two super slices SS0 and SS1, with SS0 including slices S0 and S1, and SS1 (not shown) including slices S2 and S3.

The Instruction Fetch Unit 310 fetches instructions to be executed by the processor 110 or processor slice. Instructions that are fetched by the Instruction Fetch Unit 310 are sent to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380.

In certain aspects, the ISQ 330 holds a set of instructions and the register file 380 accumulates data for the instruction inputs. A register file may be used for staging data between memory and other functional (execution) units in the processor. There may be numerous register files and types. When all source data accumulates for the instruction, the data is passed on to one or more execution units designated for execution of the instruction. Each of the execution units, e.g., LSUs 304 and VSUs 306, may make result data available on the write back buses for writing to a register file (RF) entry.

When data is not ready, e.g., not within the appropriate data cache or register, delay can result as the ISQ 330 will not issue the instruction to the Execution Unit 340. For at least this reason, the Issue Queue (ISQ) typically issues instructions to the Execution Units 340 out of order so instructions where the required data is available can be executed. Dispatch Unit 320 in one or more embodiments will stamp each instruction dispatched to the Issue Queue 330 with an identifier, e.g., identification tag (itag), to identify the instruction. The Dispatch Unit 320 may stamp instructions with other information and meta data. The instructions (itags) typically are allocated (assigned) and stamped in ascending program order on a per thread basis by the Dispatch Unit 320.

Logical register mapper 350 contains meta data (e.g., itag, RFtag, etc.) which provides a mapping between entries in the logical register (e.g., GPR1) and entries in physical register file 380 (e.g., physical register array entry). The RFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., the physical register array entry. The Execution Unit 340 executes instructions out-of-order and when the Execution Unit 340 finishes an instruction, the Execution Unit 340 will send the finished instruction, e.g., itag, to the ICT 325. The ICT 325 contains a queue of the instructions dispatched by the Dispatch Unit 320 and tracks the progress of the instructions as they are processed.

History buffer (SRB) 370 contains logical register entries the logical register mapper 350 evicts from the logical register mapper 350 by younger instructions. The information stored in the history buffer (SRB) 370 may include the itag of the instruction that evicted the logical register entry (i.e., the evictor itag) from the logical register. History buffer (SRB) 370, in an embodiment, stores itag, logical register entry number (the bit field that identifies the logical register entry (LReg)), and Register File tag (RFTag) information. The RFTag is a pointer that correlates an entry in a logical register to an entry in the Physical Register File 380. History buffer (SRB) 370 may store and track other information. History buffer (SRB) 370 has an interface to the logical register mapper 350 to recover the itag, and register file tag (RFTag) (and other meta data) for each evicted logical register entry (LReg). The information is kept in the history buffer (SRB) 370 in a history buffer (SRB) entry until the new instruction (evictor instruction) is completed. At which point, in an embodiment, the entry is removed from the history buffer.

A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple execution slices may considerably increase processing speed of the multi-slice processor. In single-thread (ST) mode a single thread is processed, and in SMT mode, two threads (SMT2) or four threads (SMT4) are simultaneously processed.

In an aspect, each execution/processing slice may have its own register file as shown in FIG. 3. In another aspect, one register file may be allocated per super slice and shared by the processing slices of the super slice. In one aspect, one register file may be allocated to more than one super slice and shared by the processing slices of the super slices. For example, slices S0, S1, S2, and S3 may be allocated to share one register file. The register files will be discussed in more detail below.

Figure 4:
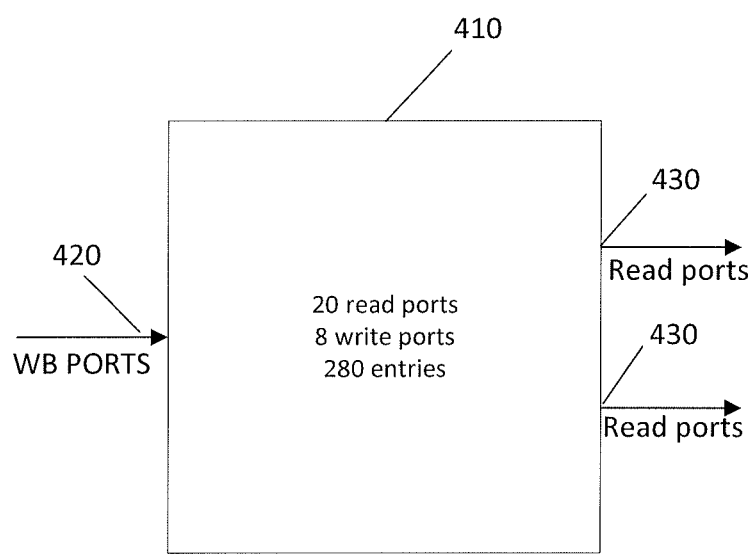
FIG. 4 illustrates an embodiment of a register file.

FIG. 4 shows a simplified block diagram of register file 410. Register file 410 has one or more write back ports 420 and one or more read ports 430. In an example, register 410 in FIG. 4 is used for two processing or execution slices S0 and S1 (a super slice) of the processor core. The read ports 430 in the embodiment of FIG. 4 are associated with, e.g., connected to, eight execution units, e.g., four (4) vector scalar units (VSU), and two load store units (LSU) and two fixed point units (FXU). Two vector scalar units (VSUs), one load store unit (LSUs) and one fixed point unit (FXU), for example, may be utilized for each execution slice. Other execution or functional units may be used in addition to or alternatively to the VSU, FXU and/or the LSU.

The present disclosure is directed to processors and in particular register files associated with processors. Register files are typically used in association with execution units, and typically stores data, e.g., operands, for use by the execution units. In operation, data may be read from the register file, e.g., a register file entry or location, and the result, for example, will be written back to the register file, usually to a different register location or entry. In a processor, many execution units may work in parallel which makes handling of data read from and written to the register files complex.

Register file 410 can be written to by all execution units of the processor (processor core) and has 280 entries, twenty (20) read ports and eight (8) write back ports. The register file 410 in an embodiment supports eight execution units, e.g., four (4) vector scalar units (VS0, VS1, VS2, VS3), two (2) fixed point units (FX0, FX1), and two (2) load store units (LS0, LS1). During a cycle of the super slice of the processor or processor core, up to twenty (20) operands in the exemplary embodiment may be read from various entries in the register file, and eight (8) results may be written back to various entries in the register file. The register file 410 in FIG. 4 is sixty-four (64) bits wide or seventy-two (72) bits wide with ECC. A register file that has many execution units that write to the register file typically has many write ports. Having numerous write ports to a register file can increase the size and power consumption of the register file and processor design. In addition, such a register file typically has a large number of read ports, which is also disadvantageous.

Disclosed is a technique, method, system, processor, and/or physical register file to increase the efficiency, decrease power consumption, and improve register and processor design. More specifically, a technique, method, system, processor and/or register architecture is disclosed that in an embodiment decreases the number of read ports, while also reducing the number of write ports in order to reduce the area overhead for the register file on the processor chip. The disclosed techniques, methods, processes, and/or systems permit the processor, register files, and execution units to run efficiently in both single thread (ST) mode or simultaneous multi-thread (SMT) mode, and to handle normal or wide data flow execution, such as, for example, when processing a vector that is wider than 64 or 72 bits.

In a first aspect, in an embodiment, the register file may be partitioned or sliced into portions, blocks or banks, where each execution unit writes to a specific portion, block or bank of the register file. This is referred to as a slice-target register file (STF). The register file is sliced into smaller banks, also referred to as blocks, so that each bank has less write ports. Having less write ports has the advantage of less power consumption, and less area of the processor chip and/or register file chip being used for write ports. In an embodiment, each execution slice may have two or more blocks or banks of register files, and may have one or more copies of the blocks or banks of register files from the other execution slices. In an embodiment, at dispatch time, a mapper will assign a block of the register file, preferably a STF block of the register file, to each execution unit. The register file (RF) entries in register file may be indexed by a tag identifier assigned by the mapper. For a slice-target register file (STF), the mapper in an embodiment assigns a STF tag and the blocks of the STF register file are indexed by the STF tag.

Figure 5:
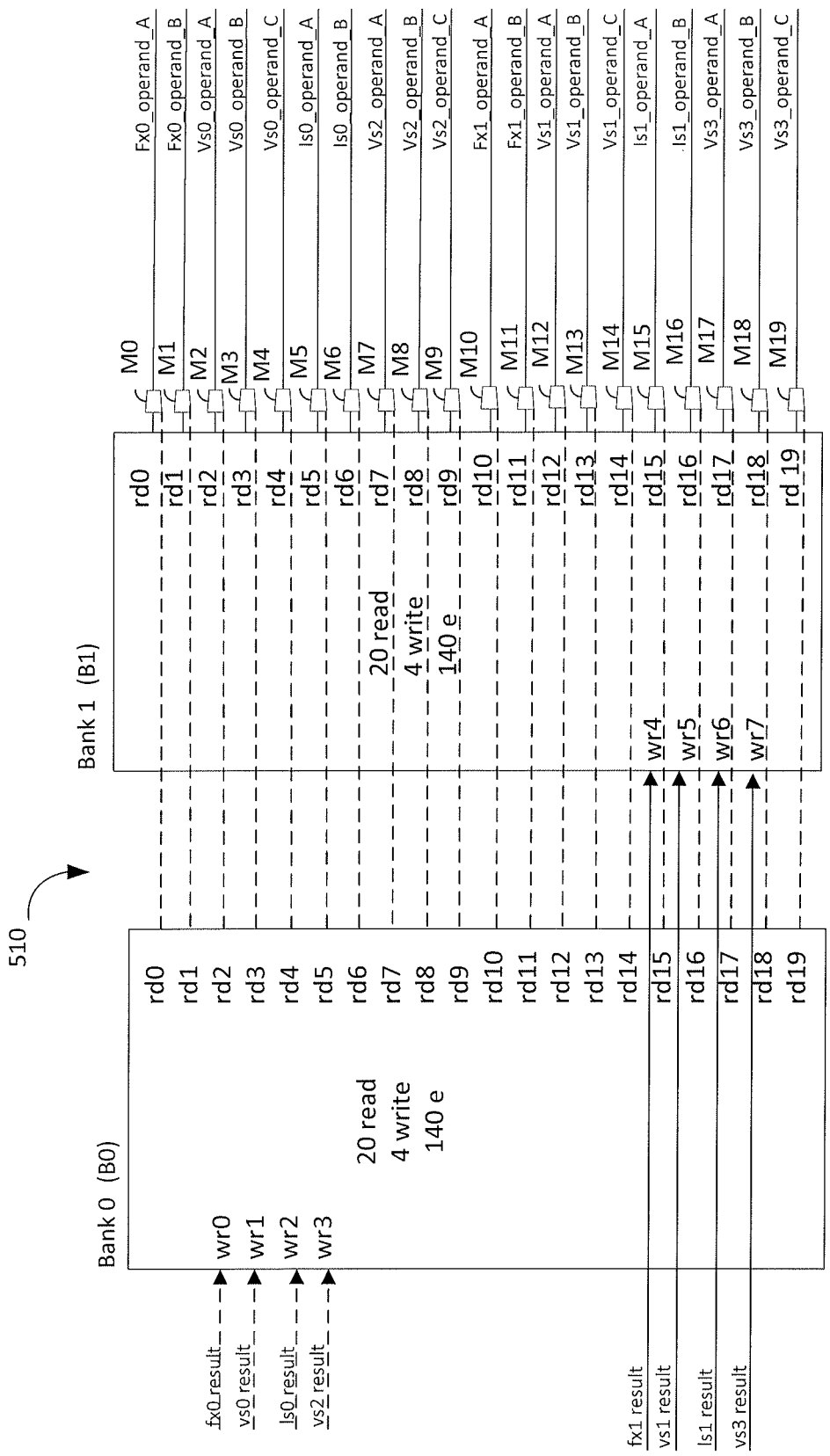
FIG. 5 illustrates an embodiment of a banked, sliced register file.

The total number of register file entries in a banked (STF) register file can remain the same as a non-banked register file For example, the register file 410 in FIG. 4 has 280 regular entries, twenty (20) read ports and eight (8) write ports. In the example of FIG. 5, the register file 510 has been sliced into two banks, Bank 0 (B0) and Bank 1 (B1) having 280 entries with each bank, B0 and B1, having 140 entries. If the register file is sliced as shown in FIG. 5, (e.g., no copies of the register files are part of the architecture), each execution unit can read from any bank. For example, each bank B0 and B1 of the register file has twenty (20) read ports rd0-rd19 and twenty (20) read multiplexors M0-M19 associated with and/or connected to the output of each read port rd0-rd19 of banks B0 and B1 permits any execution unit to read data from Bank 0 (B0) or Bank 1 (B1) of the register file 510. By splitting register file 510 into two banks B0, B1 the number of write ports (wr0-wr7) per bank has been reduced, and in this example, the number of write ports per bank has been cut in half so that Bank 0 (B0) has four (4) write ports (wr0-wr3) and Bank 1 (B1) has four (4) write ports (wr4-wr7).

In a further technique, process, method, system, processor, and/or register design, to reduce the number of read ports, and the corresponding chip area restraints, one or more copies of the banks of the register files are created. For example, in FIG. 6 Bank 0 (B0) has two copies (B0C0) and (B0C1), where B0C0 and B0C1 both have four (4) write ports wr0-wr3 and ten (10) read ports rd0-rd9. In this example, as the number of copies of the register files for each bank B0 and B1 is doubled, the number of read ports for each copy of the register banks are cut in half. The read multiplexors M0-M19 associated with and/or connected to the output of the four (4) sets of read ports rd0-rd9 permit the execution units to read from either bank B0 and B1 and by providing copies of the register files, the number of read ports per register bank is reduced. For example, in FIG. 6, register file 510 has two banks, B0 and B1, with each copy of each bank having 140 entries. Each bank has two copies of the register file and each copy of each bank has ten (10) read ports (rd0-rd9) and four write ports (wr0-wr3).

Figure 6:
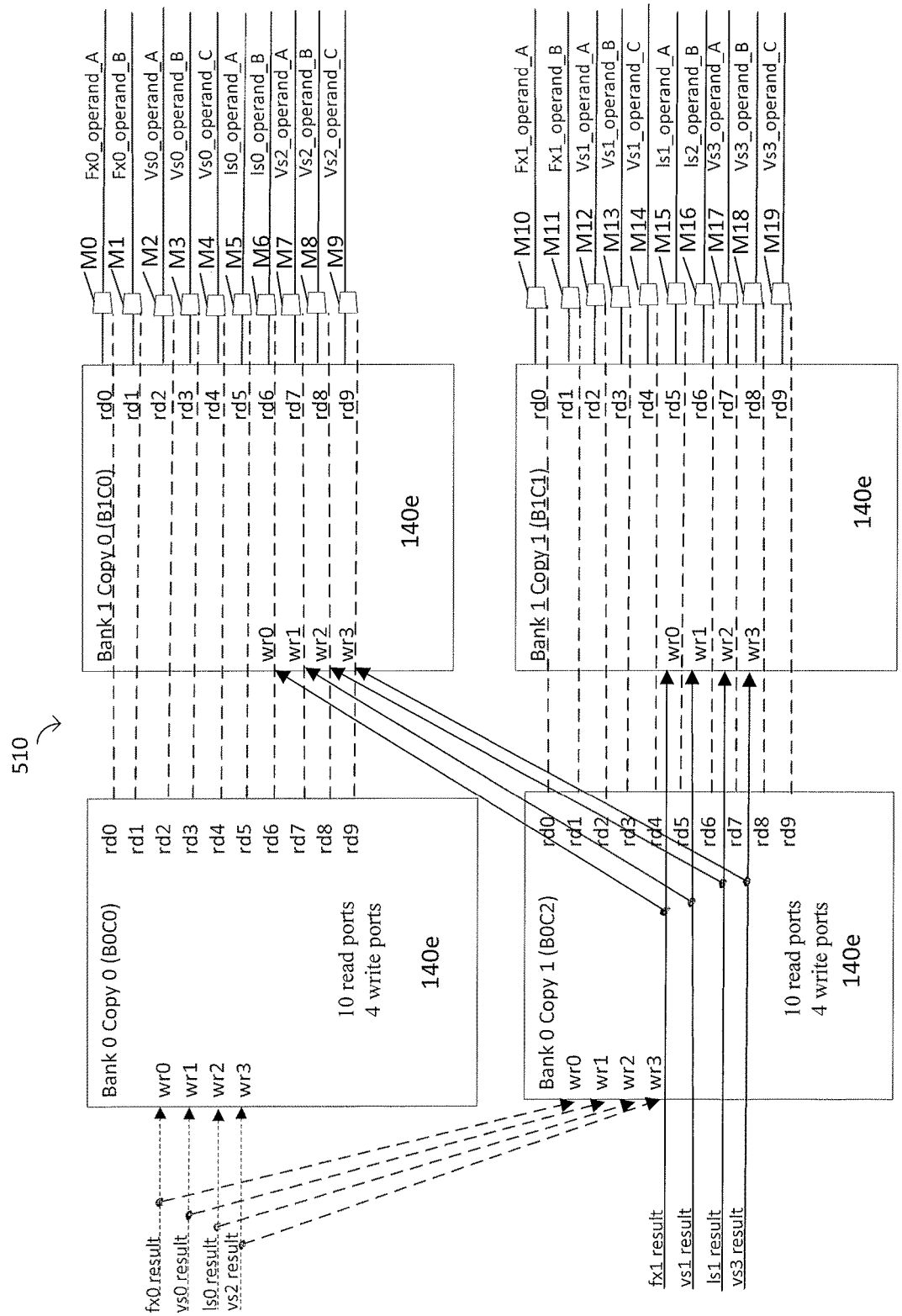
FIG. 6 illustrates another embodiment of a banked, sliced register file.

Data may be written to the register files 510, and in the example of FIG. 6 data from execution units FX0, VS0, LS0 and VS2 is written to bank 0 (B0) and data from execution units FX1, VS1, LS1 and VS3 is written to bank 1 (B1). As bank 0 has two copies, each of copies B0C0 and B0C1 has data written (received) from execution units FX0, VS0, LS0 and VS2, and since bank 1 has two copies, each of copies B1C0 and B1C1 has data written (received) from execution units FX1, VS1, LS1 and VS3. The execution units target a specific bank of the register file 510. In this manner, all the data written from the execution units resides in either bank 0 (B0) or bank 1 (B1), with multiple copies of the data in either bank.

A read multiplexor is associated with each read port, and, in the example of FIG. 6 where there are two banks, each read port rd0-rd9 from each bank copy of the register file is associated with a 2:1 multiplexor M0-M19 to read information from either bank B0 or B1 of the register file 510. Accordingly, the execution unit may obtain (read) the desired operand from either bank 0 (B0) or bank 1 (B1).

In the example of FIG. 6, the data for execution units FX0, VS0, LS0 and VS2 are read from copy 0 of bank 0 or bank 1 (B0C0 or B1C0), and the data for execution units FX1, VS1, LS1 and VS3 are read from copy 1 of bank 0 or bank 1 (B0C1 or B1C1). In FIG. 6, read multiplexors M0-M9 are associated with and/or connected to copy 0 of banks 0 and 1, e.g., B0C0 and B1C0, while read multiplexors M10-M19 are associated with and/or connected to copy 1 of banks 0 and 1, e.g., B0C1 and B1C1. The configuration of banks and copies (B0C0, B0C1, B1C0, B1C1) of register file 510 and read multiplexors M0-M19 are shown in FIG. 6 to read data for all eight execution units, e.g. twenty operands.

However, in multi-thread (SMT) mode where half of the execution units, e.g., FX0, VS0, LS0, VS2, work on a first thread (T0) and the other execution units, e.g., FX1, VS1, LS1, VS3, work on a second thread (T1), inefficiencies result because only half the write ports are used, and each thread only writes to half the register entries (e.g., 140 entries). For example in FIG. 6, where the processor is working in multi-thread (SMT) mode and FX0, VS0, LS0 and VS2 are working on the first thread T0, the results will only be written back to bank 0 copy 0 (B0C0), and the execution units will only read data from bank 0, copy 0 (B0C0), or bank 1, copy 0 (B1C0). Similarly, in FIG. 6 where the processor is working in multi-thread (SMT) mode and FX1, VS1, LS1, and VS3 are working on the second thread (T1), the results will only be written back to bank 1, copy 1 (B1C1), and the execution units will only read data from bank 0, copy 1 (B0C1), or bank 1, copy 1 (B1C1). In multi-thread (SMT) mode, not all the resources of the processor as configured and explained in connection with FIG. 6 are being utilized.

Figure 7:
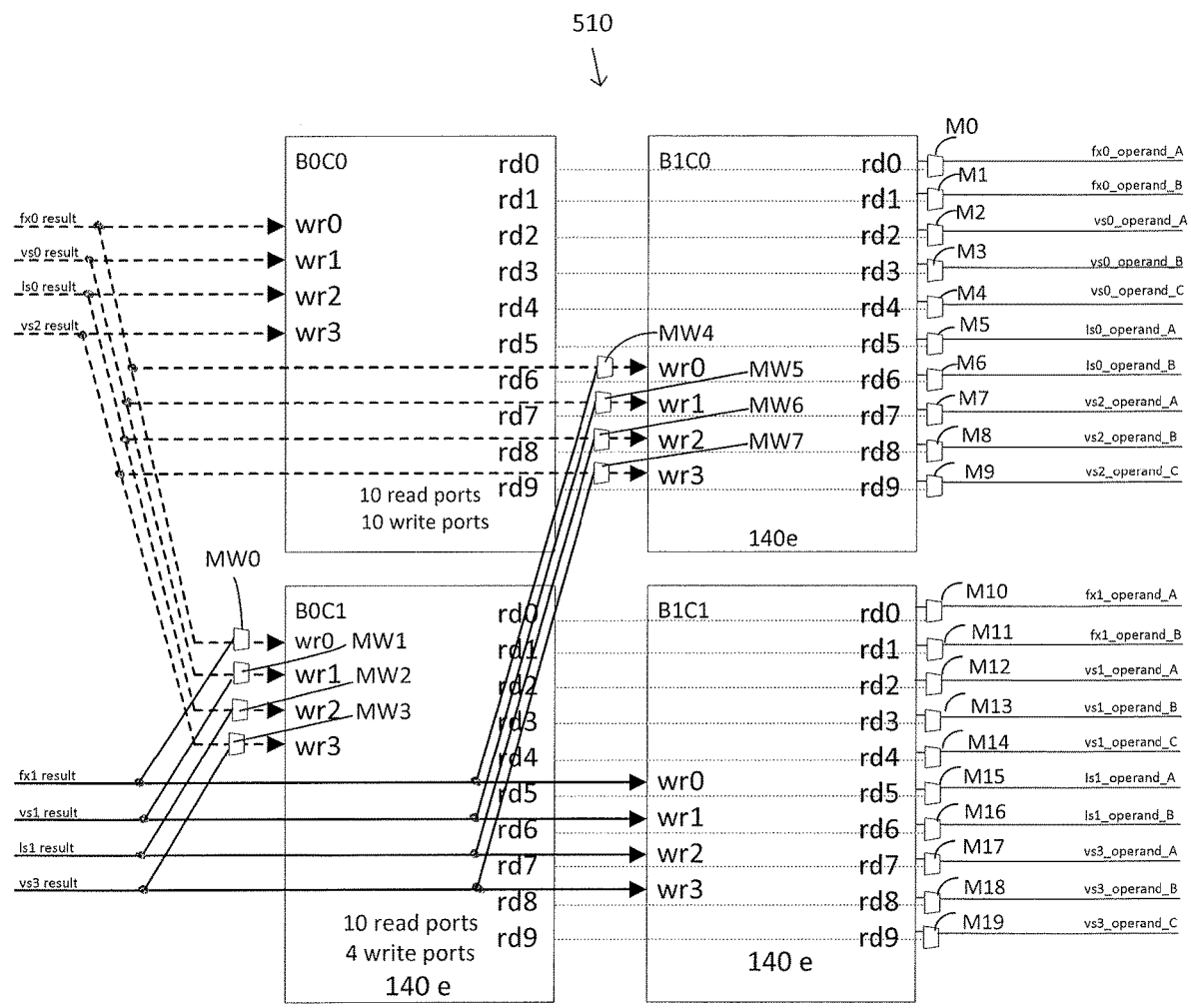
FIG. 7 illustrates another embodiment of a banked, sliced register file system.

In a further technique, process, method, system, and/or processor design, write multiplexors are added to the system to lessen these multi-thread (SMT) mode inefficiencies. FIG. 7 illustrates a system where register files have been sliced or banked to reduce write ports, copies of register fields have been utilized to reduce read ports, and write multiplexors are utilized to increase efficiency in a multi-thread (SMT) mode of operation.

In FIG. 7, register file 510 has two banks B0 and B1, and each bank has two copies, C0 and C1. Each copy of each bank, e.g., B0C0, B0C1, B1C0 and B1C1, has ten (10) read ports (rd0-rd9), four (4) write ports (wr0-wr3), and 140 entries. The register file 510 in FIG. 7, and in particular each of the read ports (rd0-rd9), are associated with a read multiplexor. Since the register file has two banks, the read multiplexor is a 2:1 multiplexor as described in FIG. 6 to read data from either of bank 0 (B0) or bank 1 (B1). In particular, in FIG. 7, read multiplexors M0-M19 are associated with the register file 510 and each instruction can read any register entry.

In FIG. 7, additional multiplexors are utilized to write data to the various banks of the register files. In the embodiment of FIG. 7, one or more sets of write multiplexors (mw0-mw3 and mw4-mw7) are associated with one copy of each of the banks B0, B1 of the register file 510. More specifically, a write multiplexor, and in an embodiment a 2:1 multiplexor, is associated with, e.g., connected to, each write port of one of the copies of a first bank of the register files, and a write multiplexor, and in an embodiment a 2:1 multiplexor, is associated with, e.g., connected to, each write port of one of the copies of the second bank of the register files. In this manner, data can be written to each bank of the register file.

For example, the result in one execution slice of one of the fixed point units (FXU), two of the vector scalar units (VSU), and one of the load store units (LSU), for example, are written to both copies of bank 0, e.g., B0C0 and B0C1, and one copy of bank 1 (B1C0). There are write multiplexor mw0, mw1, mw2, and mw3 associated with, e.g., connected to, respective write ports wr0, wr1, wr2, and wr3 of B0C1, and write multiplexors mw4, mw5, mw6 and mw7 associated with, e.g., connected to, respective write ports wr0, wr1, wr2, and wr3 of B1C0 as shown in FIG. 7. Similarly, the results in a second execution slice of two of the vector scalar units (VSU), one of the fixed point units (FXU), and one of the load store unit (LSU), for example, are written to both copies of bank 1, e.g., B1C0 and B1C1, and to a copy of bank 0 (B0C1). In the embodiment of FIG. 7, there are write multiplexors associated with the write ports of B0C1 and B1C0.

In the manner of FIG. 7, data and results from all the execution units are written to both register banks. In this manner, the number of ports for the register file has been reduced and the processor can work efficiently in both single thread (ST) mode and simultaneous multi-thread (SMT) mode. In an embodiment, the register file has been sliced or banked in order to reduce the number of write ports. In an embodiment, the register file has been sliced or banked, and copies of the banked register files are utilized. In other aspects, sliced or banked register files are utilized, and copies of registered files are used with read and write multiplexors so that each execution unit can read operands from any slice or bank of register files, and so that results and data from the execution units can be written to each register bank so that the processor can run more efficiently in simultaneous multi-threading mode.

The register files in FIGS. 5-7 are sixty-four (64) bits wide (or seventy-two (72) bits wide with ECC). With the design and configuration of the register files of FIGS. 5-7, each instruction can read any register entry in executing scalar data in single thread (ST) mode or simultaneous multi-thread (SMT) mode. For example, the super execution slice SS0 in FIG. 8 has two execution slices S0 and S1 with each execution slice having one execution unit (EXU 0 or EXU 1). The super execution slice SS0 in FIG. 8 has a register file that is for example sixty-four (64) bits wide (seventy-two (72) with ECC) with two STF banks (B0 and B1) and two STF register bank copies (C0 and C1) for a total of four STF bank register files (B0C0, B0C1, B1C0, B1C1), and four read multiplexors (M0, M1, M2 and M3), and can process two scalar instructions each cycle. One scalar instruction, e.g., sixty-four (64) bits wide (seventy-two (72) with ECC), is executed in execution slice S0 by execution unit EXU 0 where its operand data is read from register files B0C0 and B1C0 and the result data is written back to B0C0 and B0C1. Another scalar instruction, e.g., sixty-four (64) bits wide (seventy-two (72) with ECC), is executed in execution slice S1 by execution unit EXU 1 where its operand data is read from register files B0C1 and B1C1 and the resultant data is written back to B1C0 and B1C1. In this manner, two scalar instructions can be processed in each cycle, one instruction in each execution slice S0, S1. In this example, the results of the even execution unit EXU 0 are written back to the even register file banks B0, and the results of the odd execution unit are written back to the odd register file banks B1.

It is desirable to add vector instruction processing capability to the execution slices without adding write ports, read ports and/or STF register copies to the register file. Therefore, for entries holding the value of scalar registers (e.g. 64 bit-wide registers), copies C0 and C1 hold the same value. For entries holding the value of vector registers (e.g. 128 bit-wide registers), copy C0 holds one part of the vector data (e.g. 0 . . . 63) and the other copy C1 holds the other part of the vector data (e.g. 64 . . . 127), as shown in Table 1. Table 1 shows a register file without banking. Only 4 registers of each, scalar registers G0,G1,G2,G3 and vector registers V0,V1,V2,V3 are shown in Table 1, whereas in practice, there will be more (e.g. 32 scalar+64 vector) register entries. In Table 1, G denotes scalar registers, and V denotes vector registers. Scalar instructions operate on 64-bit registers (G) and vector instructions operate on 128-bit registers (V).

TABLE 1

Register file supporting both vector/scaler registers, 2 copies, no banking

| C0 | C1 |
|---|---|
| G0 (0:63) | G0 (0:63) |
| G1 (0:63) | G1 (0:63) |
| G2 (0:63) | G2 (0:63) |
| G3 (0:63) | G3 (0:63) |

TABLE 1-continued

Register file supporting both vector/scaler
registers, 2 copies, no banking

| C0 | C1 |
|---|---|
| V0 (0:63) | V0 (64:127) |
| V1 (0:63) | V1 (64:127) |
| V2 (0:63) | V2 (64:127) |
| V3 (0:63) | V3 (64:127) |

Table 2 shows the same register file, but now each register file copy is split into 2 banks. With this register file organization, FIG. 8 can be enhanced to execute vector instructions, without adding read ports.

TABLE 2

Register file supporting vector/scaler registers, 2 copies, 2
banks. Vector register randomly distributed across the banks.

| B0C0 | B0C1 |
|---|---|
| G1 (0:63) | G1 (0:63) |
| G2 (0:63) | G2 (0:63) |
| V0 (0:63) | V0 (64:127) |
| V3 (0:63) | V3 (64:127) |

| B1C0 | B1C1 |
|---|---|
| G0 (0:63) | G0 (0:63) |
| G3 (0:63) | G3 (0:63) |
| V1 (0:63) | V1 (64:127) |
| V2 (0:63) | V2 (64:127) |

Figure 8:
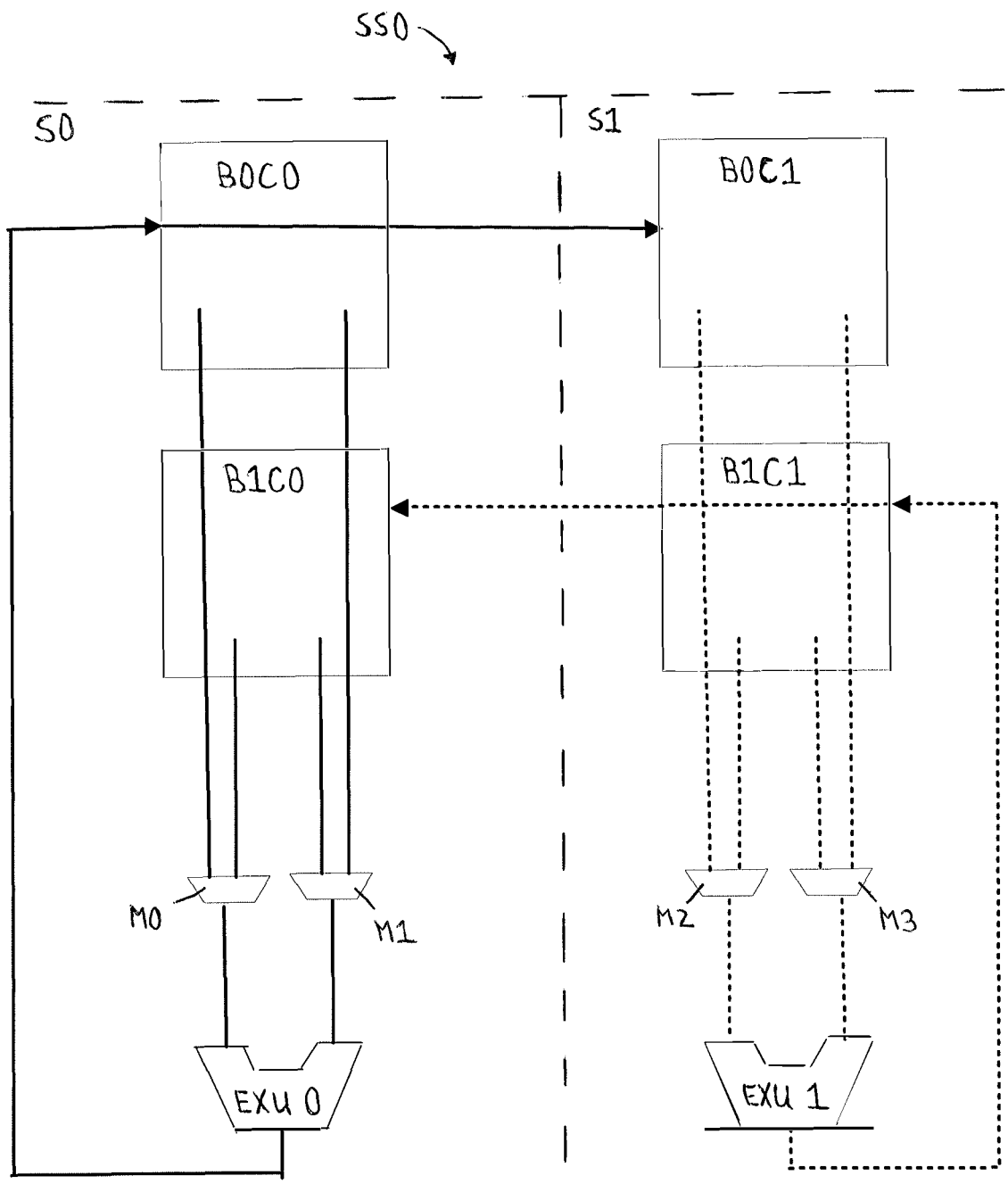
FIG. 8 illustrates a banked, sliced register file system and execution units configured for scalar data execution.
Figure 9:
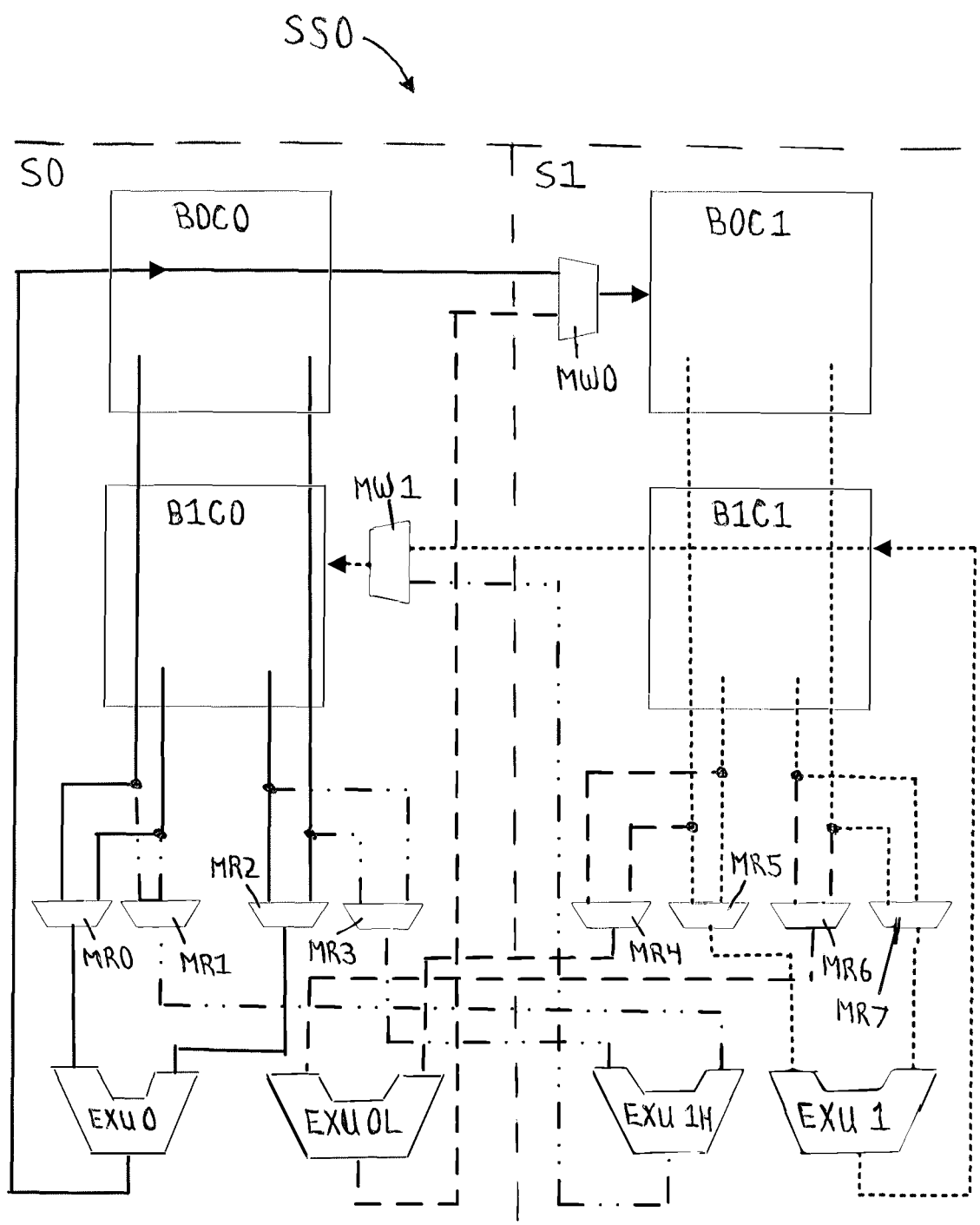
FIG. 9 illustrates a banked, sliced register file system and execution units configured to process normal and wide data flow execution, e.g., scalar and vector processing.

In the super execution slice SS0 of FIG. 9, two execution slices S0 and S1 are shown where two additional execution units are added to each super execution slice (pipeline) from FIG. 8 to handle vector (wide data) instructions per cycle. That is, there are four execution units EXU 0, EXU 0L, EXU 1, and EXU 1H in the super slice SS0 and a STF banked register file having two STF register banks B0, B1 and two STF register bank copies C0, C1 for a total of four B0C0, B0C1, B1C0, and B1C1 (same as FIG. 8), eight read multiplexors (MR0-MR7) (2:1 multiplexors because two STF banks of register files) and two write multiplexors (MW0-MW1) (2:1 multiplexors because the register file handles data for two execution slices). Each execution slice has two execution units, even execution units EXU 0 and EXU 0L or odd execution units EXU 1 and EXU 1H.

In any given cycle, two scalar instructions can issue and write back simultaneously. However, if a vector instruction issues to execution slice S0, for the vector values stored in C1 a conflict can occur with an instruction issued to execution slice S1. For example, if EXU0L needs operand A from B0C1, selected by MR4, but EXU1 also needs operand A from B0C1, selected by MR5, only one of these instructions can be executed, because MR4 and MR5 have common inputs. Only if MR4 and MR5 select different banks, can a vector instruction execute on execution slice S0 together with an instruction on execution slice S1.

Likewise, if a vector instruction issues to execution slice S1 for the vector elements stored in C0, then a conflict can occur with an instruction issued to execution slice 0. For example, if EXU1H needs operand A from B0C0 selected by MR1, but EXU0 also needs operand A from B0C0 selected by MR0, only one of these instructions can be executed because MR0 and MR1 have common inputs. Only if MR0 and MR1 select different banks can a vector instruction be executed on execution slice S1 together with an instruction on execution slice S0.

If we assume an infinite stream of vector instructions for which the schedule/dispatch logic randomly selects either of execution slices S0 or S1 for any instruction, the probability of a operand read conflict between the execution slices S0 and S1 is fifty percent (50%). For two-operand vector instructions, the conflict probability increases to 1−(50%×50%)=75% and for three-operand vector instructions, the conflict probability is even greater: 1−(50%×50%×50%)=87.5%. So only a fraction of the added execution unit bandwidth can be effectively utilized by software.

In order to improve the effective vector instruction bandwidth, we split the logical vector register set (before renaming) into two sets, for example, even and odd sets. If the instruction writes a register from the even set, the instruction scheduler will send it to execution slice S0. If the instruction writes a register from the odd set, the instruction scheduler will send it to execution slice S1. For example, for a processor architecture having 64 Vector Registers, all even Vector Registers (VR0, VR2, . . . , VR62) are put in the even set, and all 32 odd Vector Registers are put in the odd set (VR1, VR3, . . . , VR63). Note that although both sets will typically have the same size, it is not required and the split of register entries can be different.

With knowledge about how the logical vector register set is split, high-performance software can be written such that one stream of instructions uses only registers from the even set, and another stream of vector instructions uses only registers from the odd set. As long as the instruction streams are well balanced, both execution slices S0 and S1 run at maximum bandwidth and execute without read conflicts. For example, execution slice S0 read its operands from B0C0 and B0C1, whereas execution slice S1 reads its operands from B1C0 and B1C1.

In one or more embodiments, the register file entries, e.g., STF register file entries, are split into an even set of entries (VR0, VR2, VR4 . . . ) and into an odd set of entries (VR1, VR3, VR5 . . . ) as shown in Table 3.

TABLE 3

Register file supporting both vector/scaler registers,
2 copies, 2 banks. Even vector registers in bank
0 and odd vector registers in bank 1.

| B0C0 | B0C1 |
|---|---|
| G1 (0:63) | G1 (0:63) |
| G2 (0:63) | G2 (0:63) |
| V0 (0:63) | V0 (64:127) |
| V2 (0:63) | V2 (64:127) |

| B1C0 | B1C1 |
|---|---|
| G0 (0:63) | G0 (0:63) |
| G3 (0:63) | G3 (0:63) |
| V1 (0:63) | V1 (64:127) |
| V3 (0:63) | V3 (64:127) |

If a vector instruction targets an even register entry, then that instruction will execute on an even execution slice and if a vector instruction targets an odd registry entry, then that instruction will execute on an odd execution slice. Software can differentiate and determine where (what STF register bank) the result will be written. Now the maximum throughput of two vector instructions per cycle can be achieved, by providing a balanced mix of instructions operating on even and odd vector registers, respectively.

For executing vector instructions in single thread (ST) mode, or in multi-thread (SMT) mode, the registers in one or more embodiments are even/odd banked for vector data.

In operation, if a 128 bit instruction targets an even register, then the vector data is written to B0C0 and B0C1. If a 128 bit instruction targets an odd register, then the vector data is written to B1C0 and B1C1. Each instruction can read any register entry. Two vector instructions can issue simultaneously (one on EXU0 and EXU0L, the other on EXU1H and EXU1), as long as each operand is read from a different bank. In other words, for 128b instructions, it is still possible to read from the other set, but then the bank conflicts need to be taken care of by the issue queue. With bank conflicts, only one vector instruction per cycle can be processed.

In operation, execution unit EXU 0 reads operand data from register file entries in B0C0 and B1C0 and execution unit EXU 0L reads operand data from register file entries in B0C1 and B1C1. The operand data for execution unit EXU 0 is processed through two read multiplexors MR0, MR2 and the operand data for execution unit EXU 0L is processed through two read multiplexors MR4, MR6 so the correct data is delivered to even execution units EXU 0 and EXU 0L. More specifically, data bits (0:63) are read from STF banked register files B0C0 and B1C0 and sent to read multiplexors MR0 and MR2. The read multiplexors MR0 and MR2 select the desired/appropriate data bits (0:63) that are sent to execution unit EXU 0. Data bits (64:127) are read from B0C1 and B1C1 and sent to read multiplexors MR4 and MR6. The read multiplexors MR4 and MR6 select the desired/appropriate data bits (64:127) that are sent to execution unit EXU 0L. The results of execution unit EXU 0 are communicated to and written back to a register file entry in banked register file B0C0 in execution slice S0 and are communicated to write multiplexor MW0 associated with banked register file B0C1. The result of execution unit EXU 0L is also communicated to write multiplexor MW0. In wide data processing, e.g., vector processing, the write multiplexor MW0 selects the data bits received from execution unit EXU 0L to write to the STF banked register file B0C1. In this manner, the processor can process wide-data, e.g., vector instructions, and the result of each even execution unit EXU 0 and EXU 0L is written back to an even STF bank register file B0 in each execution slice S0 and S1. In normal width data processing, e.g., scalar data, the write multiplexor MW0 selects the data bits received from execution unit EXU 0 to write to the STF banked register file B0C1.

Meanwhile, execution unit EXU 1 reads operand data from register file entries in B0C1 and B1C1 and execution unit EXU 1H reads operand data from register file entries in B0C0 and B1C0. The operand data for execution unit EXU 1H is processed through two read multiplexors MR1, MR3 and operand data for execution unit EXU 1 is processed through two read multiplexors MR5, MR7 so the correct data is delivered or communicated to odd execution units EXU 1H and EXU 1. More specifically, data bits (64:127) are read from STF banked register files B0C1 and B1C1 and sent or communicated to read multiplexors MR5 and MR7. The read multiplexors MR5 and MR7 select the desired/appropriate data bits (64:127) that are sent or communicated to execution unit EXU 1. Data bits (0:63) are read from STF banked register files B0C0 and B1C0 and sent or communicated to read multiplexors MR1 and MR3. The read multiplexors MR1 and MR3 select the desired/appropriate data bits (0:63) that are sent or communicated to execution unit EXU 1H. The result of execution unit EXU 1 is communicated to and written to a register file entry in banked register B1C1 in execution slice S1 and is sent or communicated to write multiplexor MW1 associated with banked register file B1C0. The result of execution unit EXU 1H is also communicated to write multiplexor MW1. In wide data processing, e.g., vector data processing, the write multiplexor MW1 selects the data bits received from the execution unit EXU 1H to write to the STF banked register file B1C0. In normal width processing, e.g., processing of scalar instructions, the write multiplexor MW1 selects the data bits received from execution unit EXU 1 to write to STF banked register file B1C0. In this manner, the processor can process wide data, e.g, vector instructions, and the results of the odd execution units (EXU 1 and EXU 1L) which are part of odd execution slice S1, write to only one bank of register files, e.g., the odd register bank, B1. Thus, two vector operations that are greater than sixty-four (64) or seventy-two (72) bits wide, and in an embodiment are 128 bits wide, are supported by the configuration of banked register files, multiplexors, and execution units shown in FIG. 9. While the embodiment of FIG. 9 has been described in connection with processing vector instructions, it can be appreciated that the configuration of the processor in FIG. 9 can also be used for processing scalar data.

In an embodiment, the processor has at least four execution slices arranged and configured as two super slices wherein each super slice has at least two execution slices, the processor is further configured so that the register file is sliced into at least four register banks and has at least two copies of each register bank, and a first execution slice of each super slice has a plurality of execution units that write to even register banks, and a second execution slice of each super slice has a plurality of execution units that write to odd register banks, and wherein the execution units write to one or more register banks through a write multiplexor.

FIGS. 10, 11A, 11B, 11C, & 11D are exemplary flowcharts in accordance with one embodiment illustrating and describing a method of handling data, e.g., executing instructions, in a processor, including in an embodiment, processing and handling wide data instructions, e.g, vector instructions, in a processor in accordance with an embodiment of the present disclosure. While the methods 1000 and 1100 are described for the sake of convenience and not with an intent of limiting the disclosure as comprising a series and/or a number of steps, it is to be understood that the processes do not need to be performed as a series of steps and/or the steps do not need to be performed in the order shown and described with respect to FIGS. 10, 11A, 11B, 11C & 11D but the processes may be integrated and/or one or more steps may be performed together, simultaneously, or the steps may be performed in the order disclosed or in an alternate order.

Figure 10:
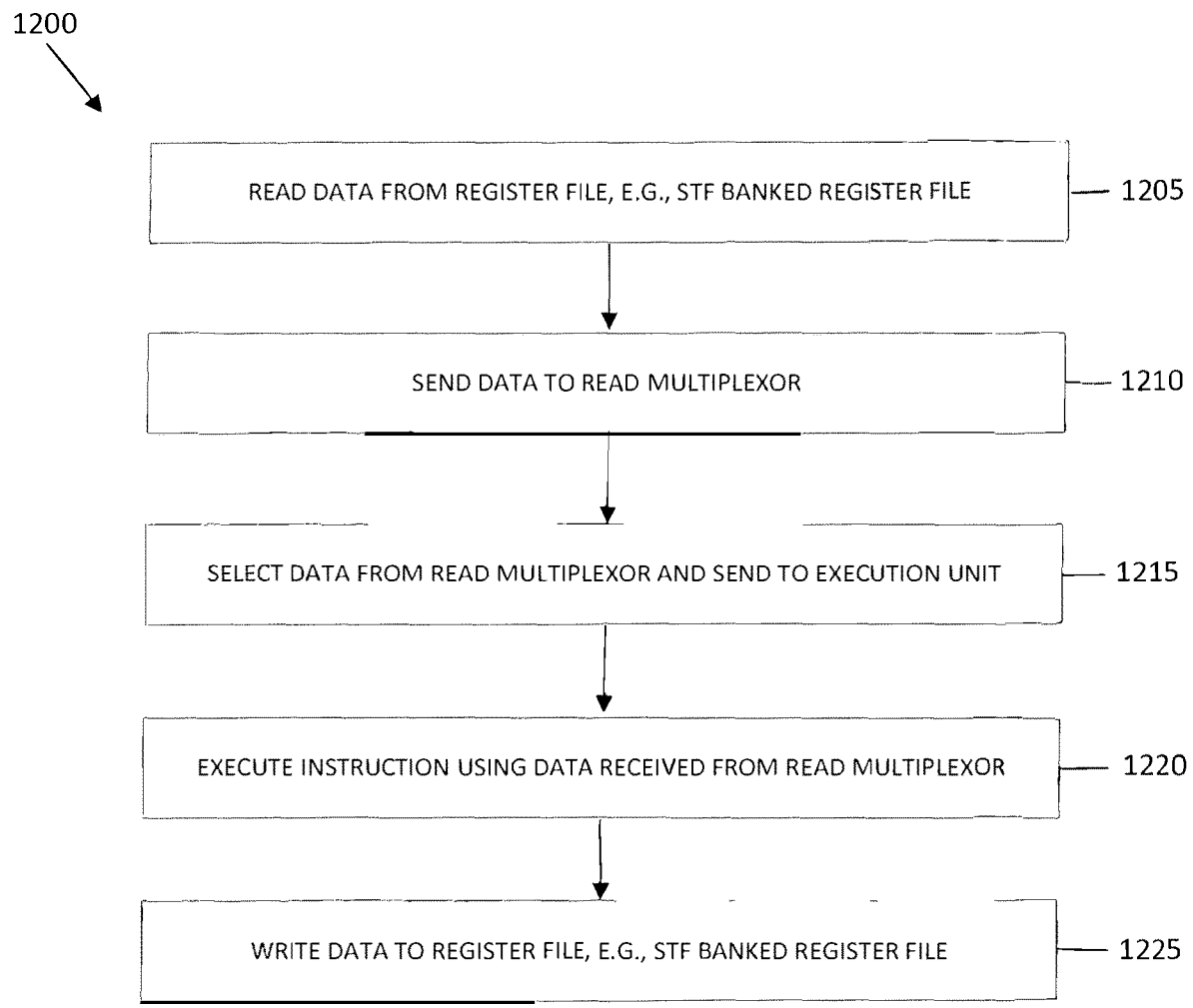
FIG. 10 is a flow diagram of a method according to an embodiment for processing data in a processor.
Figure 11A:
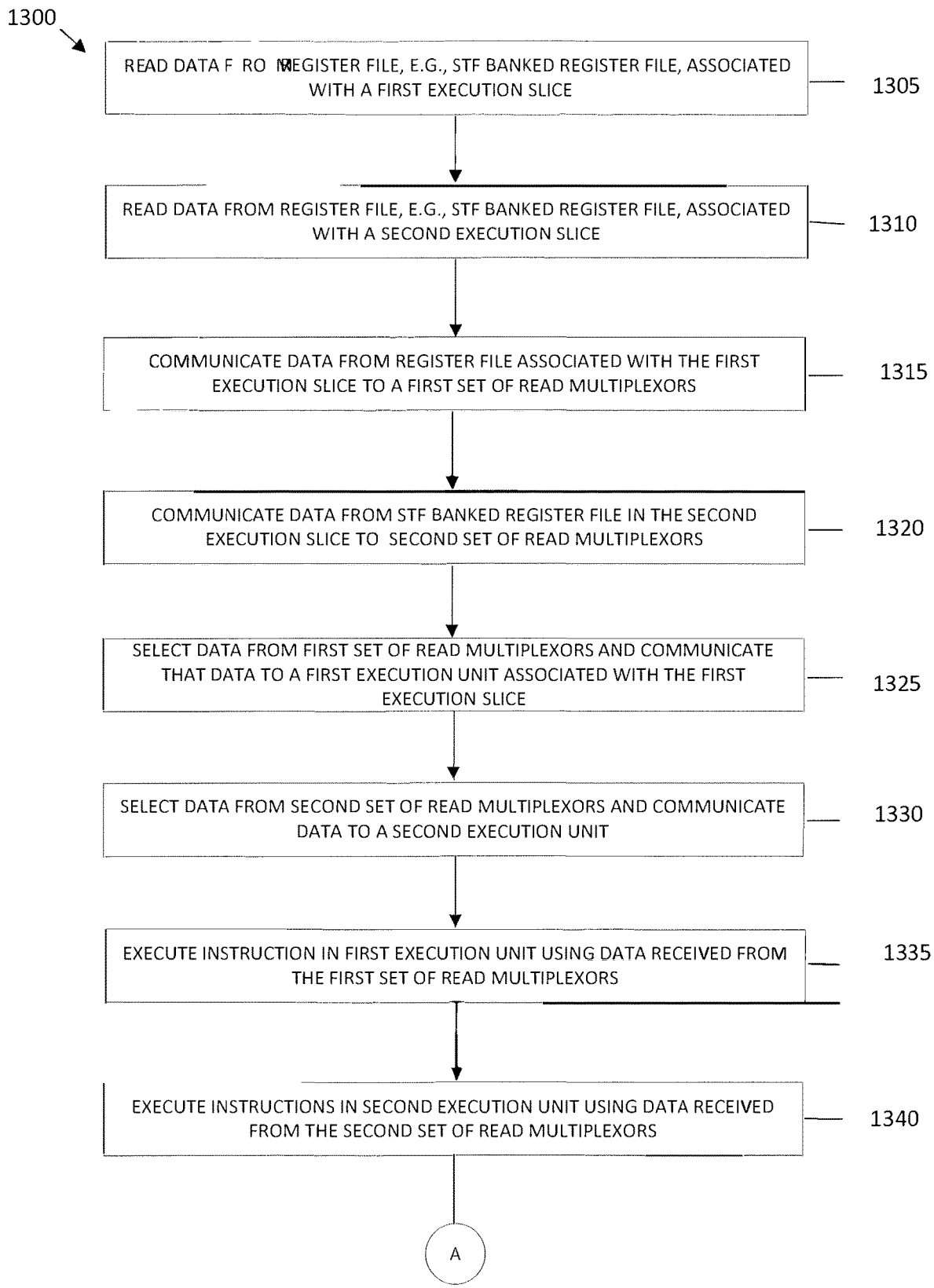
FIGS. 11A, 11B, 11C, & 11D represent a flow diagram of a method according to an embodiment for processing data in a processor, and in an embodiment shows a method for processing narrow or normal data fields and wide data fields using the same register file.
Figure 11B:
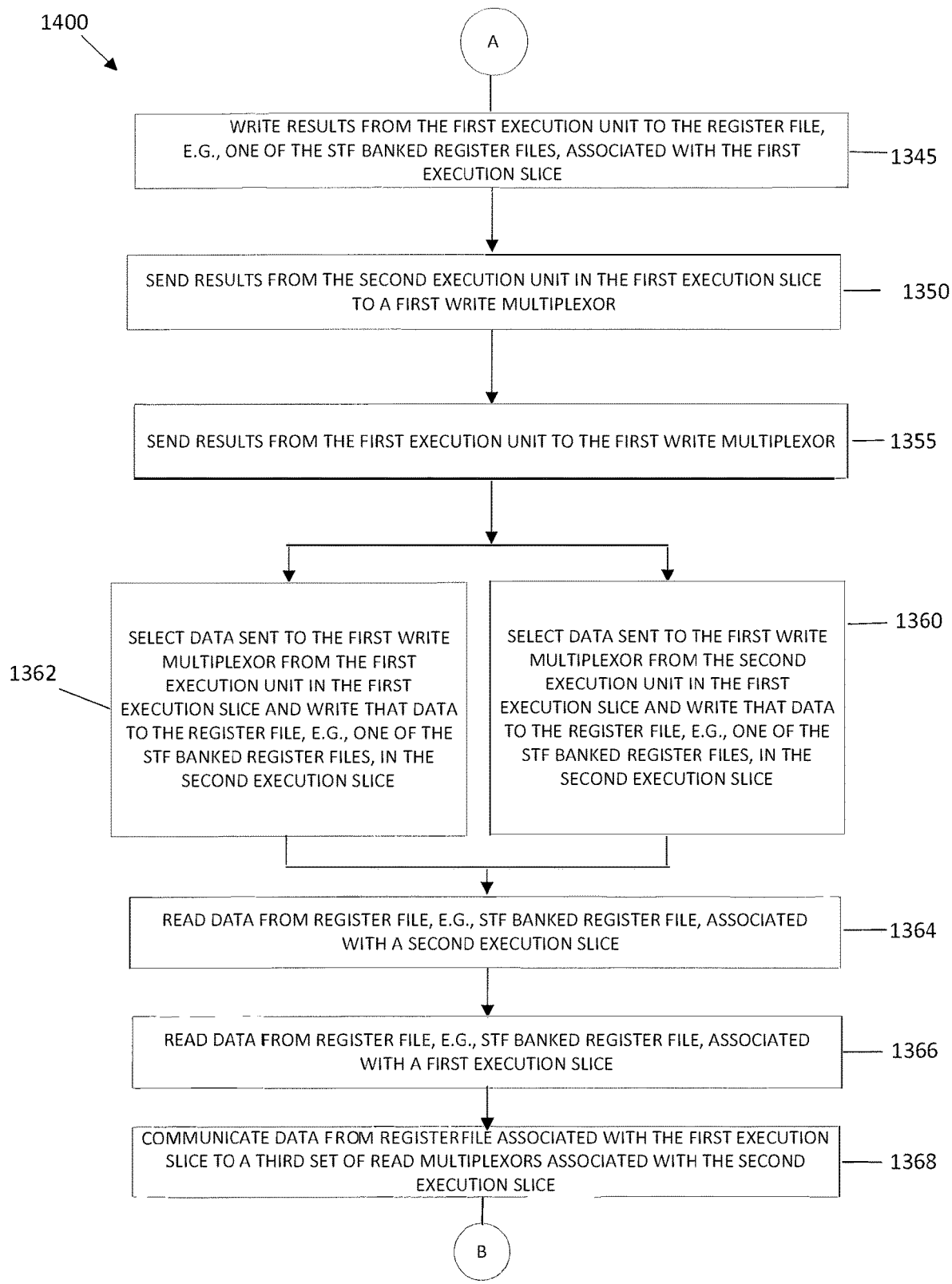
Figure 11C:
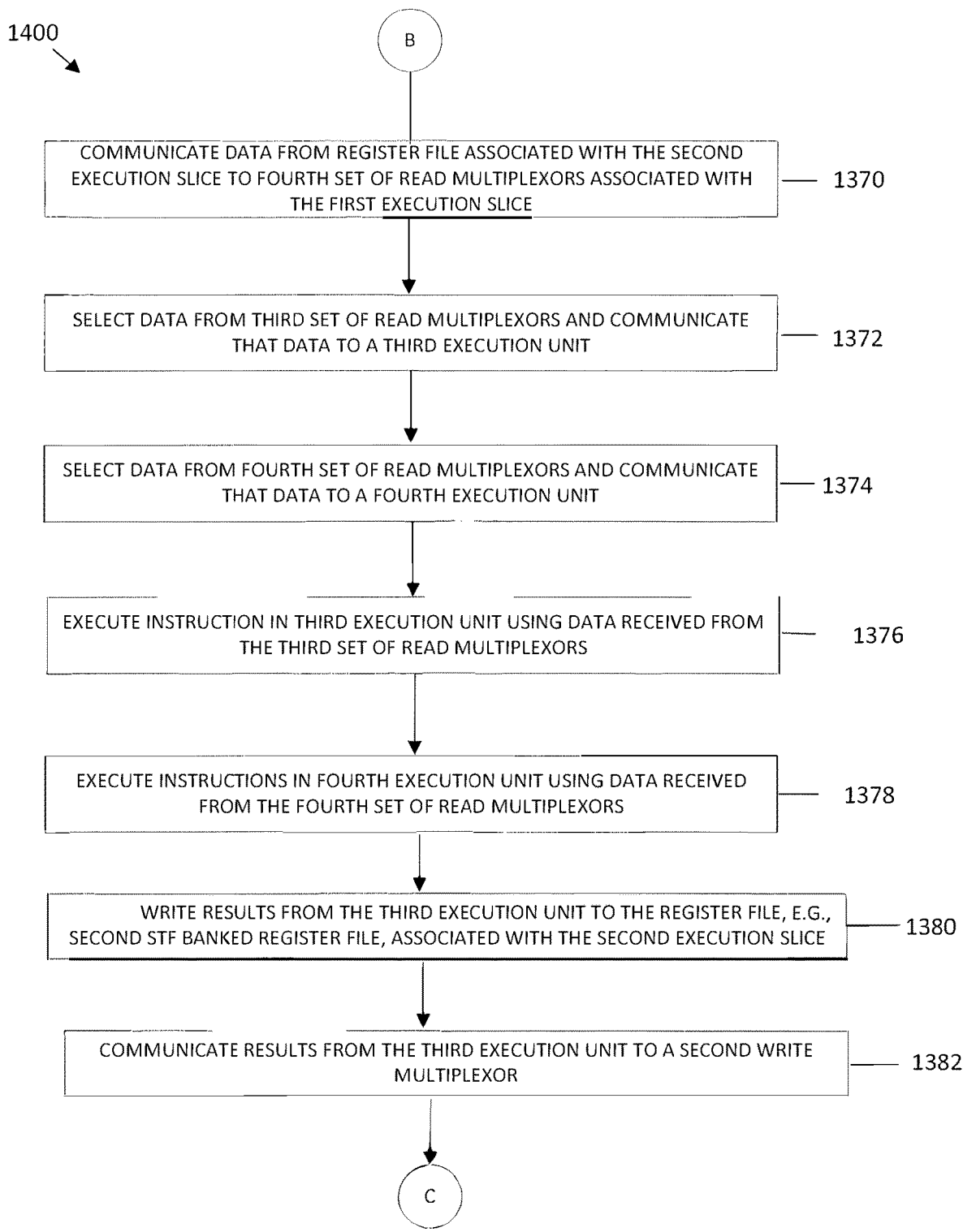
Figure 11D:
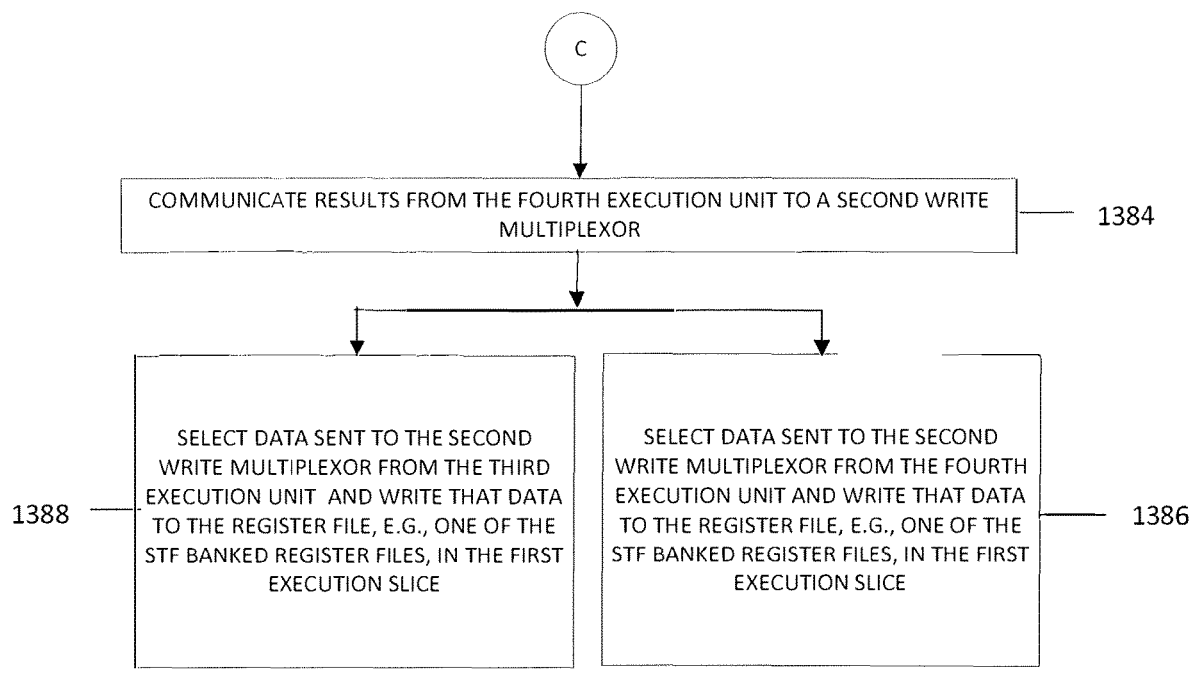

The method 1000 in FIG. 10 relates to processing data in a processor more specifically to processing scalar and vector instructions in a processor. The processor typically includes a register file to hold operand data to be used by one or more execution units for executing instructions in a processor. The register file in one or more embodiment is preferably a STF banked register file that can have one or more banks of register file entries and one or more copies of the STF banked register files. The register file in one or more embodiments is sixty-four (64) bits wide (seventy-two (72) bits wide with ECC) and in an embodiment is wide enough to support scalar data, but in one or more embodiments is not wide enough to support vector instructions. The execution units and processor can be arranged in execution slices, which can be further arranged in super execution slices. Other configurations and architectures for the processor are contemplated. In an embodiment, at 1005, data can be read from the register file, preferably from a STF banked register file that has been sliced into two or more register banks and has two or more copies of the STF register banks. In an embodiment, data can be read from the register file, e.g., a STF banked register file, preferably associated with and/or located in a first execution slice. At 1010, the data read from the register file is sent or communicated to one or more read multiplexors, and in an embodiment, data from multiple STF banked register files is sent or communicated to multiple read multiplexors. In an embodiment, the number of inputs to the read multiplexors corresponds to and/or is equal to the number of banks in the STF banked register file, e.g., a two bank register file uses a 2:1 multiplexor.

At 1015 data is selected from the one or more read multiplexors and sent or communicated to one or more execution units. At 1020, the instruction is executed using the one or more execution units and the data received from the one or more read multiplexors. In one or more embodiments, at 1025, the results from the execution units are communicated to, and in an embodiment written to, the register file, and in an example are written to one or more the STF banked register files. In one or more embodiments, the results from the execution unit, e.g., data, is communicated and written to one or more register files in one or more execution slices. For example, the results of the execution unit located in a first execution slice is written to one or more STF banked register files associated with and/or located in that first execution slice and to one or more STF banked register files associated with and/or located in a second execution slice, an execution slice the execution unit is not associated with and/or located. In one or more embodiments, the register files are sliced into even register banks and odd register banks, and one or more execution units in an even execution slice write data, e.g., their results, to the even register banks and one or more execution units in an odd execution slice write data, e.g., their results, back to the odd register banks.

The method 1100 in FIGS. 11A, 11B, 11C, & 11D relates to processing data in a processor more specifically to processing scalar and vector instructions, e.g., regular data field width (data field as wide as the register file width) or wide-data field instructions, in a processor. The processor typically includes a register file to hold operand data to be used by one or more execution units for executing instructions in a processor. In one or more embodiments, the register file is preferably a STF banked register file that can have one or more banks of register file entries and one or more copies of the STF banked register files. In one or more embodiments, the register file is wide enough to support scalar data but not vector data, and in an embodiment is sixty-four (64) bits wide (seventy-two (72) bits wide with ECC). The execution units and processor can be arranged in execution slices, which can be further arranged in super execution slices. Other configurations and architectures for the processor are contemplated.

In an embodiment, at 1105, data can be read from a register file associated with the first execution slice, preferably from a STF banked register file that has been sliced into two or more STF register banks. In an embodiment, at 1110, data can be read from the register file associated with a second execution slice, preferably from a STF banked register file that has been sliced into two or more register banks that are associated with the first execution slice, and preferably additionally has two or more copies of the STF register banks associated with the second execution slice.

At 1115, the data read from the register file associated with the first execution slice, preferably an STF banked register file sliced into two or more banks is sent, driven, and/or communicated to a first set of one or more read multiplexors, and in an embodiment, data from multiple STF banked register files associated with the first execution slice is sent or communicated to a first set of multiple read multiplexors. In an embodiment, the number of inputs to the read multiplexors in the first set of read multiplexors corresponds to and/or is equal to the number of banks in the STF banked register file associated with that execution slice. At 1120, the data read from the register file associated with the second execution slice, preferably an STF banked register file sliced into two or more banks, is sent, driven, and/or communicated to a second set of one or more read multiplexors, and in an embodiment, data from multiple STF banked register files associated with the second execution slice is sent or communicated to a second set of multiple read multiplexors. In an embodiment, the number of inputs to the read multiplexors in the second set of read multiplexors corresponds to and/or is equal to the number of banks in the STF banked register file associated with that execution slice.

At 1125 data is selected from the first set of one or more read multiplexors and sent or communicated to a first execution unit associated with and/or located in the first execution slice. At 1130 data is selected from the second set of one or more read multiplexors and sent or communicated to a second execution unit, preferably associated with and/or located in the first execution slice. At 1135, an instruction, e.g., a first instruction, is executed in the first execution unit using the data received from or communicated by the first set of one or more read multiplexors. In one or more embodiments, the first data field bits, e.g., the first half of the data bits in a wide data field instruction, e.g., a vector instruction, is executed in the first execution unit. At 1140, an instruction, e.g., a second instruction, is executed in the second execution unit using the data received from or communicated by the second set of one or more read multiplexors. In one or more embodiments, the second instruction is the same as or part of the first instruction, and in an embodiment the data field bits, e.g., the second half of the data bits, in a wide data field instruction of a vector instruction is executed in the second execution unit.

In one or more embodiments, at 1145, the results from the first execution unit is communicated to, and in an embodiment written back to the register file associated with the first execution slice, and in an example are written back to, one or more of the STF banked register files associated with the first execution slice. At 1150, results from the second execution unit preferably located in and/or associated with the first execution slice are sent, driven, and/or communicated to a first write multiplexor. At 1155, results from the first execution unit in and/or associated with the first execution slice are also sent, driven, and/or communicated to the first write multiplexor. In an embodiment, if processing a wide-data instruction, e.g., a vector instruction, data sent to the first write multiplexor from the second execution unit in the first execution slice is selected at 1160 by the first write multiplexor and that selected data is sent, driven, and/or communicated, and in one or more embodiments is further written, to one of the register files associated with the second execution slice, more preferably to one of the (copies of the) STF banked register files in the second execution slice. At 1162, if processing regular width data, e.g., data as wide as or less wide than the register file (scalar data), data sent and/or communicated to the first write multiplexor from the first execution unit associated with and/or located in the first execution slice is selected by the first write multiplexor and that selected data is sent, driven, and/or communicated, and in one or more embodiments is further written, to one of the register files, preferably one of the STF banked register files copies, associated with the second execution slice.

In one or more embodiments, the results from the execution units, e.g., data, are written to one or more register file entries in one or more execution slices, and in an example is written to more than one register file bank. For example, the results of the execution unit associated with and/or located in a first execution slice is written back to one or more STF banked register files associated with that first execution slice and to one or more STF banked register files associated with a second execution slice, i.e., an execution slice with which the execution unit is not associated or located. In an embodiment where the STF register is banked into even and odd STF banked register files and banked register file copies, the execution units associated with the even execution slices write back to the even STF register banks and the execution units associated with the odd execution slices write back to the odd (copies of) STF register banks.

The process 1100 can optionally continue at 1164, where data can be read from the register file associated with the second execution slice, preferably from a STF banked register file that has been sliced into two or more STF register banks. In an embodiment, at 1166, data can be read from the register file associated with the first execution slice, preferably from a STF banked register file that has been sliced into two or more register banks that are associated with the first execution slice, and preferably additionally has two or more copies of the STF register banks associated with the second execution slice.

At 1168, the data read from the register file associated with the second execution slice, preferably an STF banked register file sliced into two or more banks, is sent, driven, and/or communicated to a third set of one or more read multiplexors, and in an embodiment, data from multiple STF banked register files associated with the second execution slice is sent or communicated to a third set of multiple read multiplexors. At 1170, the data read from the register file associated with the first execution slice, preferably an STF banked register file sliced into two or more banks, is sent, driven, and/or communicated to a fourth set of one or more read multiplexors, and in an embodiment, data from multiple STF banked register files associated with the first execution slice is sent or communicated to a fourth set of multiple read multiplexors. In one or more embodiments, the number of inputs to the read multiplexors in the third and/or fourth set of read multiplexors corresponds to and/or is equal to the number of banks in the STF banked register file associated with the respective execution slice.

At 1172 data is selected from the third set of one or more read multiplexors and sent or communicated to a third execution unit, preferably in the second execution slice. At 1174 data is selected from the fourth set of one or more read multiplexors and sent or communicated to a fourth execution unit, preferably in the second execution slice. At 1176, an instruction, e.g., a third instruction, is executed in the third execution unit using the data received from and/or communicated by the third set of one or more read multiplexors. In one or more embodiments, the first data field bits, e.g., the first half of the data bits in a wide data field instruction, e.g., a vector instruction, is executed in the third execution unit. At 1178, an instruction, e.g., a fourth instruction, is executed in the fourth execution unit using the data received from and/or communicated by the fourth set of one or more read multiplexors. In one or more embodiments, the fourth instruction is the same as or part of the third instruction, and in an embodiment the data field bits, e.g., the second half of the data bits, in a wide data field instruction e.g., vector instruction, is executed in the fourth execution unit.

In one or more embodiments, at 1180, the results from the third execution unit is communicated to, and in an embodiment written to the register file associated with the second execution slice, and in an example are written back to one or more of the (copies of the) STF banked register files associated with the second execution slice. At 1182, results from the third execution unit preferably in and/or associated with the second execution slice are sent, driven, and/or communicated to a second write multiplexor. The second write multiplexor preferably is associated with one of the banked register files associated with and/or located in the first execution slice. At 1184, results from the fourth execution unit, preferably in and/or associated with the second execution slice, are also sent, driven, and/or communicated to the second write multiplexor. In an embodiment, if a wide-data instruction, e.g., a vector instruction, is being executed, data sent to the second write multiplexor from the fourth execution unit associated with and/or located in the second execution slice is selected at 1186 by the second write multiplexor and that selected data is sent, driven, and/or communicated, and in one or more embodiments is further written, to one of the register files associated with the first execution slice. At 1188, is processing regular width data, e.g., data as wide as or less wide than the register file (scalar data), data sent to and/or communicated to the second write multiplexor from the third execution unit in the second execution slice is selected by the second write multiplexor and that selected data is sent, driven, and/or communicated, and in one or more embodiments is further written, to one of the register files associated with the first execution slice, preferably one of the STF banked register files.

While the illustrative embodiments described above are preferably implemented in hardware, such as in units and circuitry of a processor, various aspects of the illustrative embodiments may be implemented in software as well. For example, it will be understood that each block of the flowcharts illustrated in FIGS. 10 and 11A, 11B, 11C & 11D, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustrations, can be implemented by special purpose hardware-based computer systems that perform the specified functions or steps, or by combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer system for processing information, the computer system comprising:
   at least one processor;
   a register file associated with the at least one processor, the register file having a plurality of entries for storing data and sliced into a plurality of register banks, each register bank having a portion of the plurality of entries for storing data, one or more write ports to write data to the register file entries, and a plurality of read ports to read data from the register file entries;
   one or more read multiplexors associated with one or more read ports of each register bank and configured to receive data from the respective register banks; and
   one or more write multiplexors associated with one or more of the register banks and configured to write data to at least one of the plurality of register banks,
   wherein the processor has at least two execution slices arranged and configured as a super slice wherein a first execution slice has at least two register banks and a second execution slice has at least a copy of each of the register banks in the first execution slice, and the first execution slice has a plurality of execution units that are configured to write to even register banks, and the second execution slice has a plurality of execution units that are configured to write to odd register banks.

2. The computer system of claim 1, further comprising a plurality of execution units, wherein the processor is configured so that each execution unit receives data from one or more of the read multiplexors, and sends results to one or more write multiplexors.

3. The computer system of claim 1, wherein the number of inputs to the read multiplexors is equal to the number of register banks in the execution slice associated with the read respective multiplexor.

4. The computer system of claim 1, wherein the super slice has at least eight read multiplexors, at least four execution units, and two write multiplexors, wherein a first set of at least four read multiplexors are configured to read data from the at least two register banks in the first execution slice, and a second set of at least four read multiplexors are configured to read data from the at least two register banks in the second execution slice.

5. The computer system of claim 4, wherein two of the read multiplexors in the first set of read multiplexors are configured to send data to a first execution unit in the first execution slice, and two other read multiplexors in the first set of multiplexors are configured to send data to a first execution unit in the second execution slice.

6. The computer system of claim 5, wherein two of the read multiplexors in the second set of read multiplexors are configured to send data to a second execution unit in the second execution slice, and two other read multiplexors in the second set of multiplexors are configured to send data to a second execution unit in the first execution slice.

7. The computer system of claim 4, wherein the first execution unit in the first execution slice is configured to communicate its result to a write port in the first register bank in the first execution slice and to a first write multiplexor, and an output of the first write multiplexor is configured to communicate to a write port of a first copy of the register bank in the second execution slice.

8. The computer system of claim 7, wherein the second execution unit in the first execution slice is configured to communicate its result to the first write multiplexor.

9. The computer system of claim 8, wherein the processor is configured so that the results from the first execution unit in the first execution slice is communicated to the write port in the first register bank in the first execution slice, and configured so that input communicated to the first write multiplexor from the first execution unit in the first execution slice is selected as the output of the first write multiplexor and communicated to the write port of the copy of the first register bank in the second execution slice.

10. The computer system of claim 9, wherein the processor is configured so that the results from the second execution unit in the second execution slice is communicated to a write port in the copy of the second register bank in the second execution slice and to a second write multiplexor, and an output of the second write multiplexor is communicated to a write port of the second register bank in the first execution slice, and the processor is further configured so that input communicated to the second write multiplexor from the second execution unit in the second execution slice is selected as the output of the second write multiplexor and communicated to the write port of the second register bank in the first execution slice.

11. The computer system of claim 7, wherein the processor is configured so that in response to processing wide data instructions the result from the first execution unit in the first execution slice is communicated to the write port in the first register bank in the first execution slice, and configured so that input communicated to the first write multiplexor from the second execution unit in the first execution slice is selected as the output of the first write multiplexor and communicated to the write port of a first copy of the register bank in the second execution slice.

12. The computer system of claim 11, wherein the processor is configured so that the result from the second execution unit in the second execution slice is communicated to a write port in a second copy of the register bank in the second execution slice and to a second write multiplexor, and an output of the second write multiplexor is configured to communicate to a write port of a second register bank in the first execution slice.

13. The computer system of claim 12, wherein the first execution unit in the second execution slice is configured to communicate its result to the second write multiplexor.

14. The computer system of claim 13, wherein the processor is configured so that in response to processing wide data instructions the result from the second execution unit in the second execution slice is communicated to the write port in the second copy of the register bank in the second execution slice, and configured so that input communicated to the second write multiplexor from the first execution unit in the second execution slice is selected as the output of the second write multiplexor and communicated to the write port of the second register bank in the first execution slice.

15. The computer system of claim 14, wherein the register banks are divided into at least a first set and a second set of register banks, wherein the processor is configured so that instructions writing their result to a register entry from the first set of register banks execute on the first execution slice, and instruction writing their result to a register entry from second set of register banks execute on the second execution slice.

16. A computer system for processing information, the computer system comprising:
    at least one processor;
    a register file associated with the at least one processor, the register file having a plurality of entries for storing data and sliced into a plurality of register banks, each register bank having a portion of the plurality of entries for storing data, one or more write ports to write data to the register file entries, and a plurality of read ports to read data from the register file entries;
    one or more read multiplexors associated with one or more read ports of each register bank to receive data from the respective register banks;
    one or more write multiplexors associated with one or more register banks to write data to at least one of the plurality of register banks;
    a plurality of execution units;
    one or more computer readable non-transitory storage media; and
    programming instructions stored on the one or more computer readable non-transitory storage media for execution by the at least one processor,
    wherein the processor has at least two execution slices arranged and configured as a super slice, and the super slice has at least eight read multiplexors, at least four execution units, and two write multiplexors,
    wherein a first set of at least four read multiplexors are configured to read data from the at least two register banks in the first execution slice, and a second set of at least four read multiplexors are configured to read data from the at least two register banks in the second execution slice, and two of the read multiplexors in the first set of read multiplexors have outputs communicating to a first execution unit in the first execution slice, and two of the read multiplexors in the second set of read multiplexors have outputs communicating to a second execution unit in the first execution slice,
    wherein the first execution unit in the first execution slice communicates its result to a write port in the first register bank in the first execution slice and to a first write multiplexor,
    wherein the second execution unit in the first execution slice communicates its results to the first write multiplexor, and
    wherein an output of the first write multiplexor communicates with a write port of a copy of the first register bank in the second execution slice,
    the programming instructions comprising:
        programming instructions so that each execution unit receives data from one or more read multiplexors;
        programming instructions so that each execution unit sends results to one more write multiplexors;
        programming instructions so that in response to processing wide data instructions, the result from the first execution unit in the first execution slice is communicated to the write port in the first register bank in the first execution slice,
        programming instructions so that in response to processing wide data instructions, the input communicated to the first write multiplexor from the second execution unit in the first execution slice is selected as the output of the first write multiplexor and communicated to the write port of the copy of the first register bank in the second execution slice, and
        programming instructions so that in response to processing wide data instructions, the output of the first write multiplexor communicated to the write port of the copy of the first register bank in the second execution slice is written to the copy of the first register bank in the second execution slice.

17. A method of processing instructions in a processor, the method comprising:
    reading data from one or more slice-target register file (STF) banked register files associated with a first execution slice of the processor;
    reading data from one or more STF banked register files associated with a second execution slice of the processor;
    communicating data read from the STF banked register files associated with the first execution slice to a first set of read multiplexors associated with the first execution slice;
    communicating data read from the STF banked register files associated with the second execution slice to a second set of read multiplexors associated with the second execution slice;
    selecting data from the first set of read multiplexors and communicating that data to a first execution unit in the first execution slice;
    selecting data from the second set of read multiplexors and communicating that data to a second execution unit;
    executing a first instruction in the first execution unit using data received from the first set of read multiplexors;
    executing a second instruction in the second execution unit using data received from the second set of read multiplexors;
    writing results from the first execution unit to a first STF banked register file associated with the first execution slice;
    communicating results from the second execution unit to a first write multiplexor;
    communicating results from the first execution unit to the first write multiplexor; and
    in response to a width of the data being processed, selecting data sent to the first write multiplexor from (a) the first execution unit, or (b) the second execution unit, and communicating and writing respective data to a first STF banked register file associated with the second execution slice, wherein the first and second instructions are part of the same instruction when processing a wide data instruction.

18. The method of claim 17 further comprising:

reading data from one or more STF banked register files associated with a second execution slice of the processor;

reading data from one or more STF banked register files associated with a first execution slice of the processor;

communicating data read from the STF banked register files associated with the second execution slice to a third set of read multiplexors associated with the second execution slice;

communicating data read from the STF banked register files associated with the first execution slice to a fourth set of read multiplexors associated with the first execution slice;

selecting data from the third set of read multiplexors and communicating that data to a third execution unit;

selecting data from the fourth set of read multiplexors and communicating that data to a fourth execution unit;

executing a third instruction in the third execution unit using data received from the third set of multiplexors;

executing a fourth instructions in the fourth execution unit using data received from the fourth set of multiplexors;

writing results from the third execution unit to a second STF banked register file associated with the second execution slice;

communicating results from the third execution unit to a second write multiplexor;

communicating results from the fourth execution unit to the second write multiplexor; and in response to the width of the data being processed, selecting data sent to the second write multiplexor from (a) the third execution unit, or (b) the fourth execution unit, and communicating and writing the respective data to a second STF banked register file associated with the first execution slice, wherein the third and fourth instructions are part of the same instruction when processing a wide data instruction.

* * * * *